(12) United States Patent
Shaffer

(10) Patent No.: US 8,863,734 B2
(45) Date of Patent: Oct. 21, 2014

(54) GAS GRILL

(75) Inventor: Timothy Scott Shaffer, LaGrange, KY (US)

(73) Assignee: General Electric Company, Schenectady, NY (US)

( * ) Notice: Subject to any disclaimer, the term of this patent is extended or adjusted under 35 U.S.C. 154(b) by 862 days.

(21) Appl. No.: 12/325,688

(22) Filed: Dec. 1, 2008

(65) Prior Publication Data

US 2010/0132692 A1    Jun. 3, 2010

(51) Int. Cl.
*F24C 3/00* (2006.01)
*A47J 37/07* (2006.01)

(52) U.S. Cl.
CPC .......... *A47J 37/0713* (2013.01); *A47J 37/0786* (2013.01)
USPC ................... 126/39 N; 126/39 BA; 126/39 E; 137/637; 137/599.01

(58) Field of Classification Search
CPC ............ F23N 2035/15; F23N 2035/18; F23N 2037/10; F23N 2037/20; G05D 16/0605
USPC ..... 126/39 E, 39 BA, 39 N; 137/637, 599.01; 431/2
See application file for complete search history.

(56) References Cited

U.S. PATENT DOCUMENTS

| | | | | |
|---|---|---|---|---|
| 1,874,971 A | * | 8/1932 | Hall et al. ...................... | 236/1 R |
| 1,960,162 A | * | 5/1934 | Moorshead ..................... | 236/69 |
| 2,156,533 A | * | 5/1939 | Harper .......................... | 431/193 |
| 2,208,956 A | * | 7/1940 | Allenbaugh .................... | 431/60 |
| 2,276,629 A | * | 3/1942 | Rich ............................. | 239/544 |
| 2,304,140 A | | 12/1942 | Bergholm | |
| 2,308,555 A | * | 1/1943 | Tate ............................. | 236/1 E |
| 2,640,531 A | * | 6/1953 | Lamar .......................... | 431/284 |
| 2,791,380 A | * | 5/1957 | Symes et al. ................. | 236/21 R |
| 2,820,130 A | * | 1/1958 | Dadson ........................ | 219/413 |
| 3,076,605 A | * | 2/1963 | Holden ........................ | 236/15 R |
| 3,167,251 A | * | 1/1965 | Kriechbaum ................. | 236/68 B |
| 3,241,542 A | * | 3/1966 | Lotter .......................... | 126/39 J |
| 3,358,735 A | * | 12/1967 | Luft ............................. | 431/29 |
| 3,504,660 A | * | 4/1970 | McArthur, Jr. et al. ...... | 126/21 R |
| 3,589,846 A | * | 6/1971 | Place et al. ................... | 431/29 |
| 3,597,139 A | * | 8/1971 | Elders ........................... | 431/66 |
| 3,807,933 A | * | 4/1974 | Fernstrom ..................... | 431/66 |
| 3,894,834 A | * | 7/1975 | Estes ............................ | 431/174 |

(Continued)

FOREIGN PATENT DOCUMENTS

DE    102004029991 B3 *   9/2005
EP          183879 A1 *   6/1986

(Continued)

*Primary Examiner* — Jorge Pereiro
(74) *Attorney, Agent, or Firm* — Global Patent Operation; Douglas D. Zhang

(57) ABSTRACT

A control system for a gas grill is disclosed. The gas grill has a cooking surface. The control system includes at least two fuel flow valves located between a fuel source and at least one grill burner, a user interface unit configured to receive grill operation settings, at least one temperature sensor disposed adjacent to the cooking surface and configured to detect at least a grill operating temperature and a control unit configured to, receive the grill operation settings from the user interface unit, receive the grill operating temperature from the at least one temperature sensor, and automatically control the at least one fuel flow valve for modulating the amount of fuel delivered to the at least one grill burner to maintain the grill operating temperature at a predetermined temperature based on the operation settings and the grill operating temperature.

18 Claims, 32 Drawing Sheets

In Parallel Manual & Hi Flow Solenoid Valves with Dual Zone Burner

(56) References Cited

U.S. PATENT DOCUMENTS

| | | | | |
|---|---|---|---|---|
| 4,036,995 A | * | 7/1977 | Koether et al. | 426/233 |
| 4,097,224 A | * | 6/1978 | Cooksley | 431/352 |
| 4,125,357 A | | 11/1978 | Kristen et al. | |
| 4,252,300 A | * | 2/1981 | Herder | 266/144 |
| 4,425,930 A | * | 1/1984 | Kruto | 137/1 |
| 4,457,291 A | * | 7/1984 | Henke | 126/21 A |
| 4,478,246 A | * | 10/1984 | Sherrod | 137/557 |
| 4,485,965 A | * | 12/1984 | McGinnis | 236/11 |
| 4,492,336 A | * | 1/1985 | Takata et al. | 236/20 A |
| 4,521,183 A | * | 6/1985 | Hirai et al. | 432/37 |
| 4,549,571 A | | 10/1985 | Kelly | |
| 4,585,161 A | * | 4/1986 | Kusama et al. | 236/15 BD |
| 4,602,610 A | * | 7/1986 | McGinnis | 126/110 E |
| 4,644,967 A | * | 2/1987 | Wyatt et al. | 137/599.05 |
| 4,681,084 A | * | 7/1987 | Grech | 126/52 |
| 4,815,439 A | * | 3/1989 | Houck | 126/39 G |
| 4,834,644 A | * | 5/1989 | Snow | 431/1 |
| 4,848,393 A | * | 7/1989 | West | 137/312 |
| 4,850,530 A | | 7/1989 | Uecker | |
| 4,899,724 A | | 2/1990 | Kuechler | |
| 4,930,488 A | | 6/1990 | Pearman et al. | |
| 5,003,960 A | | 4/1991 | Hanagan | |
| 5,063,963 A | * | 11/1991 | Smith | 137/606 |
| 5,127,824 A | | 7/1992 | Barker | |
| 5,241,463 A | | 8/1993 | Lee | |
| 5,244,379 A | | 9/1993 | Stirling et al. | |
| 5,321,229 A | * | 6/1994 | Holling et al. | 219/445.1 |
| 5,348,224 A | | 9/1994 | Consadori et al. | |
| 5,429,111 A | | 7/1995 | Akamatsu | |
| 5,560,349 A | * | 10/1996 | Lucero | 126/41 R |
| 5,607,294 A | * | 3/1997 | Gianpiero et al. | 431/46 |
| 5,617,840 A | | 4/1997 | Clifford | |
| 5,628,242 A | | 5/1997 | Higley | |
| 5,666,889 A | * | 9/1997 | Evens et al. | 110/190 |
| 5,676,043 A | * | 10/1997 | Best | 126/39 B |
| 5,749,718 A | * | 5/1998 | Berlincourt | 431/60 |
| 5,787,874 A | * | 8/1998 | Krohn et al. | 126/39 BA |
| 5,813,394 A | | 9/1998 | Clifford | |
| 5,875,773 A | | 3/1999 | Jansen | |
| 5,938,425 A | * | 8/1999 | Damrath et al. | 431/62 |
| 5,947,370 A | * | 9/1999 | Rona et al. | 236/20 A |
| 5,975,884 A | | 11/1999 | Dugger | |
| 6,130,412 A | | 10/2000 | Sizemore | |
| 6,155,160 A | | 12/2000 | Hochbrueckner | |
| 6,164,958 A | | 12/2000 | Huang et al. | |
| 6,287,108 B1 | | 9/2001 | Rothenberger et al. | |
| 6,289,792 B1 | | 9/2001 | Grando et al. | |
| 6,324,046 B1 | * | 11/2001 | Kadah | 361/166 |
| 6,352,428 B1 | * | 3/2002 | Uribetxebarria et al. | 431/80 |
| 6,354,830 B1 | * | 3/2002 | de Nanclares | 431/80 |
| 6,488,022 B2 | | 12/2002 | Shingler | |
| 6,554,197 B2 | * | 4/2003 | Marbach et al. | 236/20 A |
| 6,560,967 B1 | | 5/2003 | Cohen et al. | 60/776 |
| 6,609,904 B2 | * | 8/2003 | Chen | 431/71 |
| 6,684,757 B2 | | 2/2004 | Petersen | |
| 6,788,211 B2 | | 9/2004 | Kouznetsov et al. | |
| 6,818,869 B2 | * | 11/2004 | Patti et al. | 219/489 |
| 6,835,062 B2 | * | 12/2004 | Mitchell et al. | 431/29 |
| 6,881,055 B2 | | 4/2005 | Bird | |
| 7,082,941 B2 | * | 8/2006 | Jones et al. | 126/39 H |
| 7,231,917 B2 | * | 6/2007 | Frederiksen | 126/39 G |
| 7,467,639 B2 | * | 12/2008 | Watson et al. | 137/1 |
| 7,513,247 B2 | * | 4/2009 | Clauss et al. | 126/39 E |
| 7,575,000 B2 | * | 8/2009 | Jones et al. | 126/39 H |
| 7,669,590 B2 | * | 3/2010 | Oberhomburg | 126/214 R |
| 7,703,389 B2 | * | 4/2010 | McLemore et al. | 99/413 |
| 7,741,941 B2 | * | 6/2010 | Buezis et al. | 335/265 |
| 7,793,648 B2 | * | 9/2010 | Satou | 126/1 R |
| 7,793,649 B2 | * | 9/2010 | Barkhouse et al. | 126/39 G |
| 2002/0086254 A1 | * | 7/2002 | Chen | 431/51 |
| 2002/0086255 A1 | * | 7/2002 | Chen | 431/51 |
| 2002/0130190 A1 | * | 9/2002 | Marbach et al. | 236/20 R |
| 2003/0047553 A1 | * | 3/2003 | Patti et al. | 219/400 |
| 2004/0191711 A1 | * | 9/2004 | Watson et al. | 431/12 |
| 2004/0202975 A1 | * | 10/2004 | Bird | 431/75 |
| 2004/0261779 A1 | * | 12/2004 | Pickering | 126/39 E |
| 2005/0000957 A1 | * | 1/2005 | Jones et al. | 219/450.1 |
| 2005/0098169 A1 | * | 5/2005 | Frederiksen | 126/41 R |
| 2006/0057520 A1 | * | 3/2006 | Saia et al. | 431/281 |
| 2006/0201495 A1 | * | 9/2006 | Jones et al. | 126/25 R |
| 2007/0204858 A1 | * | 9/2007 | Abelbeck | 126/41 R |
| 2008/0129432 A1 | * | 6/2008 | Buezis et al. | 335/265 |
| 2009/0183729 A1 | * | 7/2009 | Barkhouse et al. | 126/39 BA |

FOREIGN PATENT DOCUMENTS

| | | | |
|---|---|---|---|
| EP | 1081570 A1 | * | 3/2001 |
| GB | 2275985 A | * | 9/1994 |
| GB | 2316463 A | * | 2/1998 |
| JP | 56071714 A | * | 6/1981 |

* cited by examiner

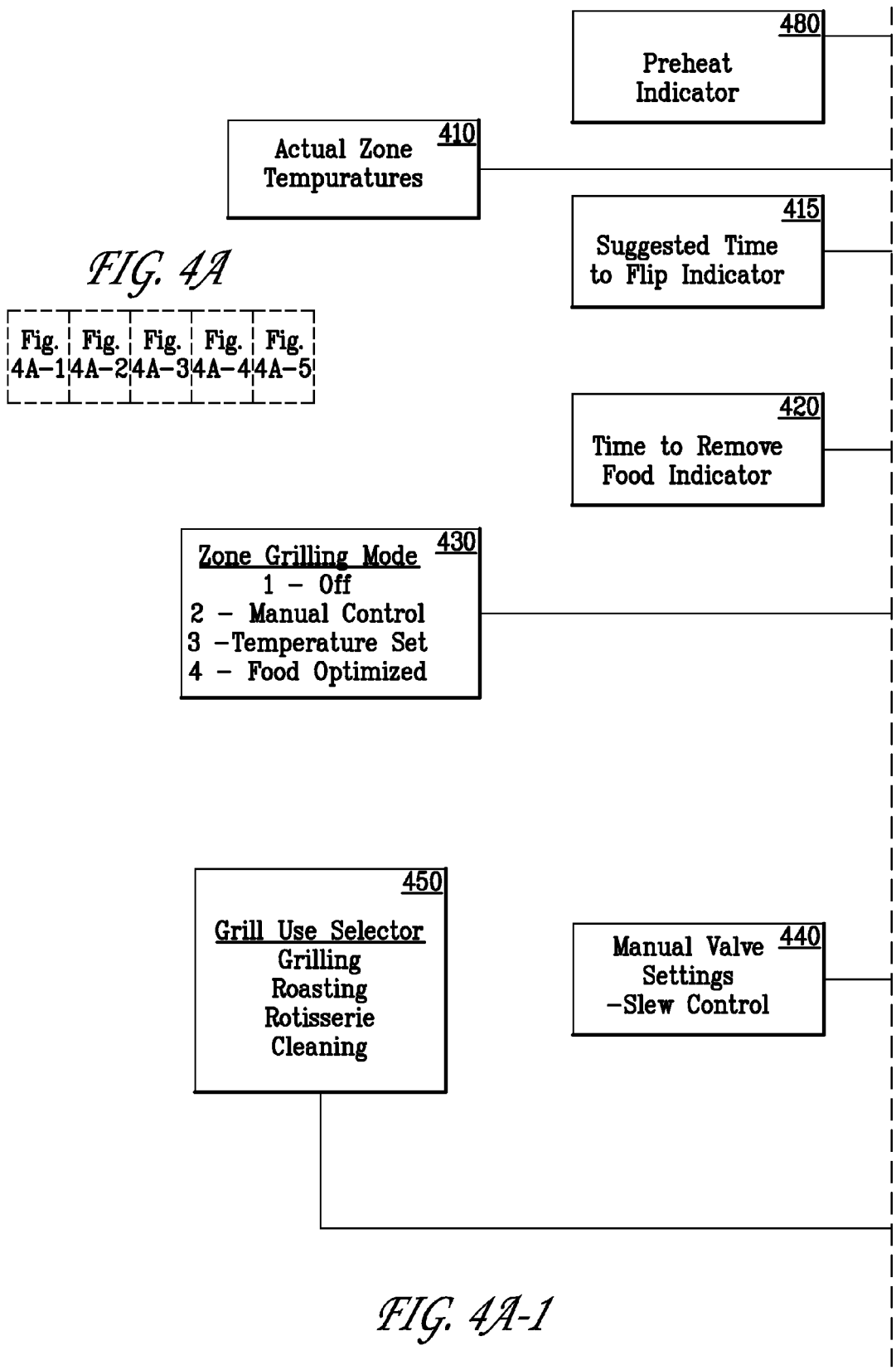

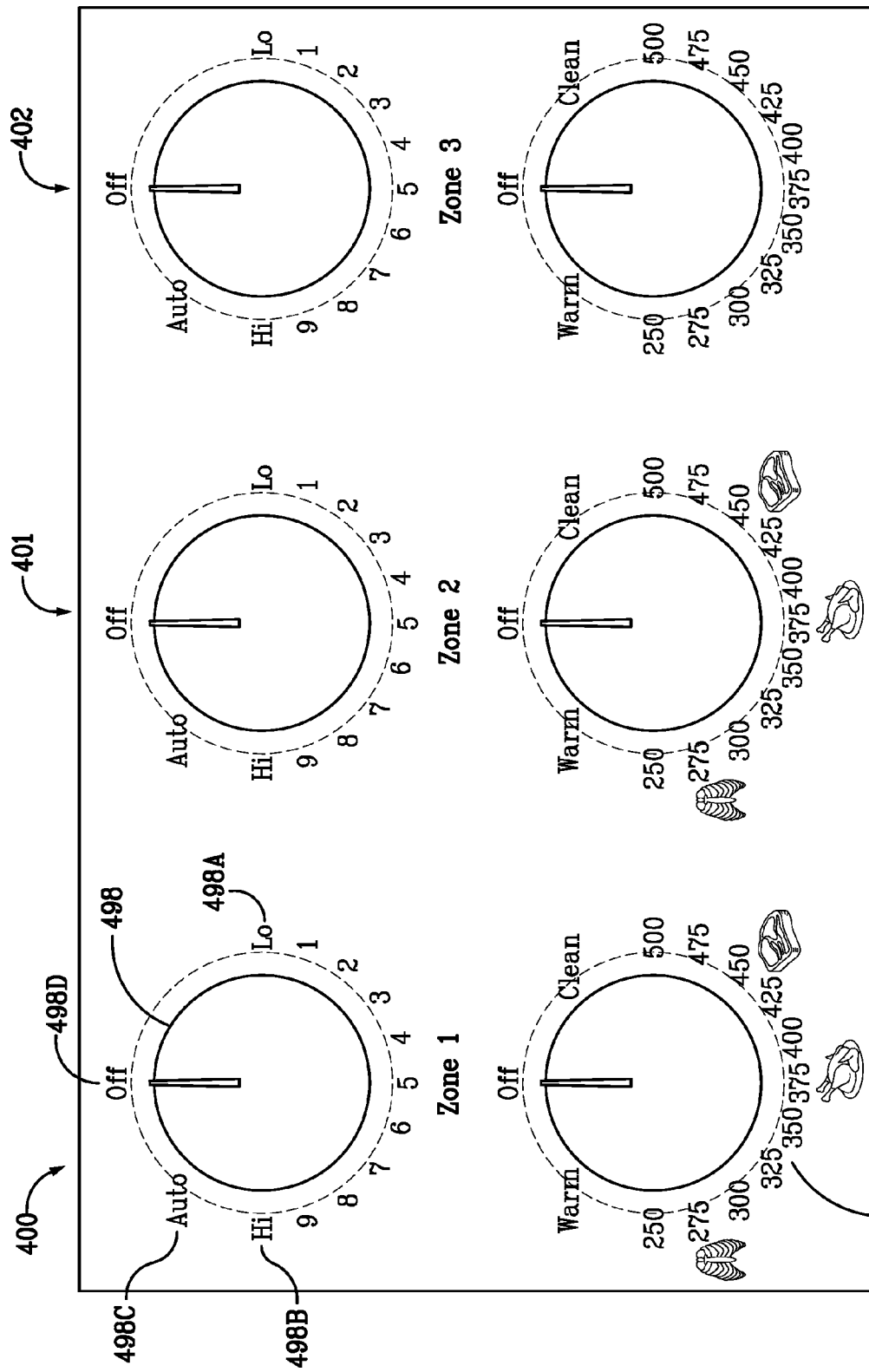

GAS GRILL

BACKGROUND OF THE INVENTION

The exemplary embodiments of the invention generally relate to gas grills. More particularly, the exemplary embodiments relate to control systems for gas grills.

Conventional grills, such as for example, outdoor gas grills are generally controlled manually by a user using mechanical flow valves. For example, to adjust the flame on a grill a user turns a gas flow control knob associated with a burner of the grill. This allows more or less gas to flow through the burner. The user generally adjusts the flames based on some visual indicator such as a flare-up due to, for example, dripping grease or burning or charring of the food being cooked. The flame adjustments are often made continually throughout the grilling process to improve the cooking performance of the grill. Moreover, control of the gas flow control knob and the valve may be inconsistent between the different users of the grill. This often results in food that is not consistently cooked.

BRIEF DESCRIPTION OF THE INVENTION

As described herein, the exemplary embodiments overcome one or more of the above or other disadvantages known in the art.

One aspect of the exemplary embodiments relates to a control system for a gas grill. The gas grill has a cooking surface. The control system includes at least two fuel flow valves located between a fuel source and at least one grill burner, a user interface unit configured to receive grill operation settings, at least one temperature sensor disposed adjacent to the cooking surface and configured to detect at least a grill operating temperature and a control unit configured to, receive the grill operation settings from the user interface unit, receive the grill operating temperature from the at least one temperature sensor, and automatically control the at least one fuel flow valve for modulating the amount of fuel delivered to the at least one grill burner to maintain the grill operating temperature at a predetermined temperature based on the operation settings and the grill operating temperature.

Another aspect of the exemplary embodiments relates to a gas grill. The gas grill includes a plurality of grilling zones each having at least one burner and a cooking surface, a temperature sensor located within each of the grilling zones and adjacent to the respective cooking surface, the temperature sensor being configured to detect an operating temperature of a respective one of the grilling zones, a user interface for receiving grill operating settings and a control unit configured to automatically control a temperature of each of the grilling zones based on a respective operating temperature of the grilling zones and the grill operating settings.

Still another aspect of the exemplary embodiments relates to a method for controlling a gas grill. The method comprises automatically modulating at least one burner in a respective grilling zone of the gas grill between high and low burner settings depending on at least a comparison between a grill operating temperature and a predetermined grill temperature set point.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein. In addition, any suitable size, shape or type of elements or materials could be used.

BRIEF DESCRIPTION OF THE DRAWINGS

In the drawings:

FIGS. 4A and 4B are schematic illustrations of exemplary user interface units for a gas grill in accordance with an exemplary embodiment;

DETAILED DESCRIPTION OF THE EXEMPLARY EMBODIMENTS OF THE INVENTION

Figure 1A:
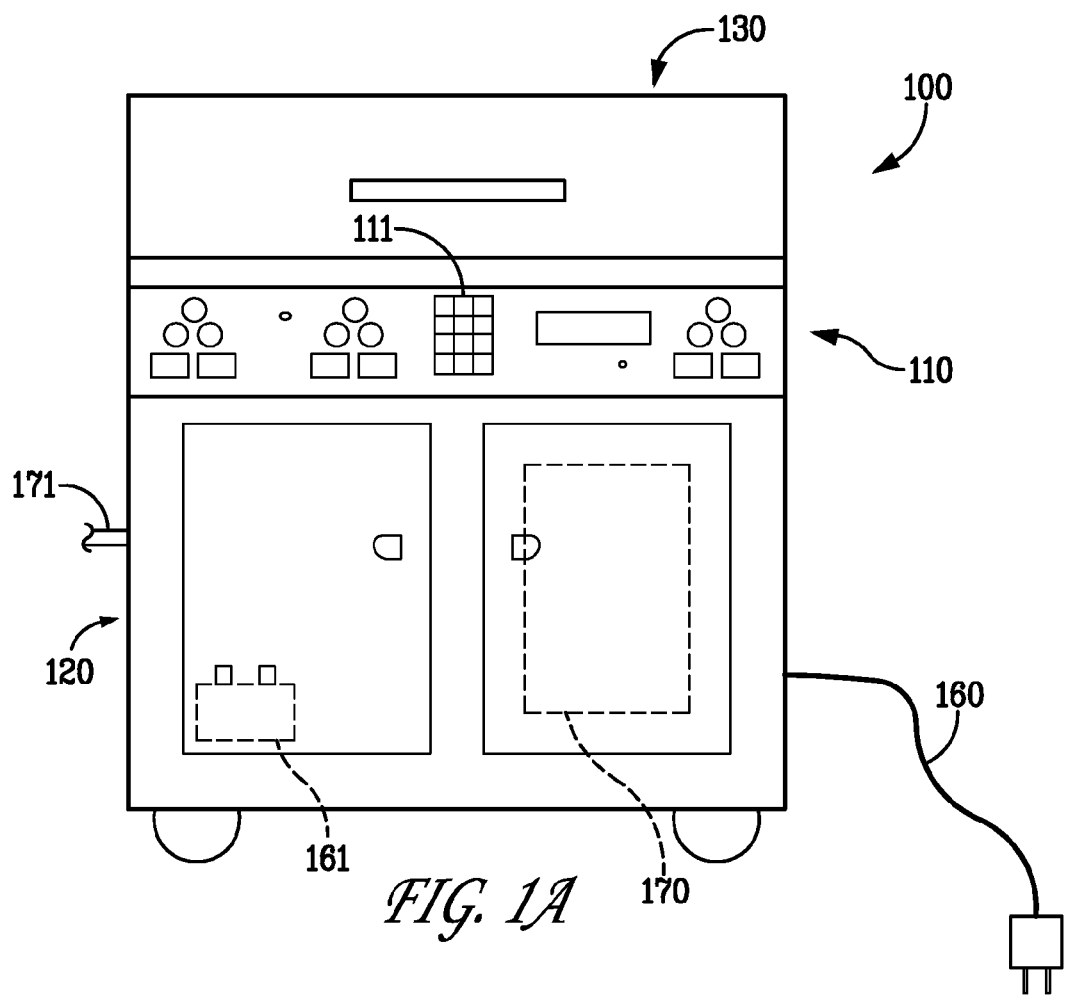
FIGS. 1A and 1B are respectively schematic illustrations of a grill rack area and a front view of a gas grill in accordance with an exemplary embodiment.
Figure 1B:
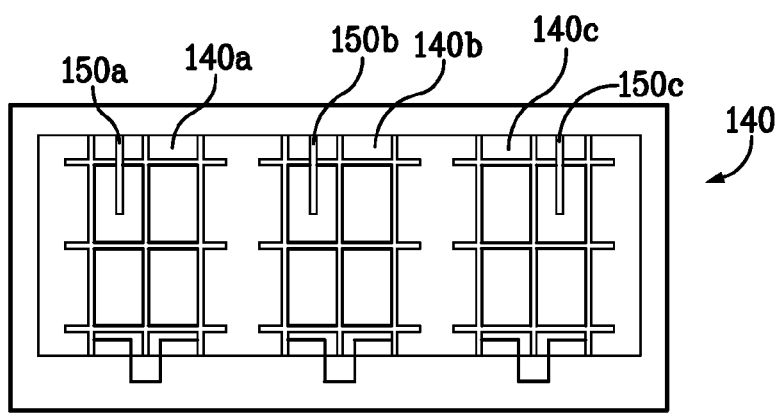
Figure 6:
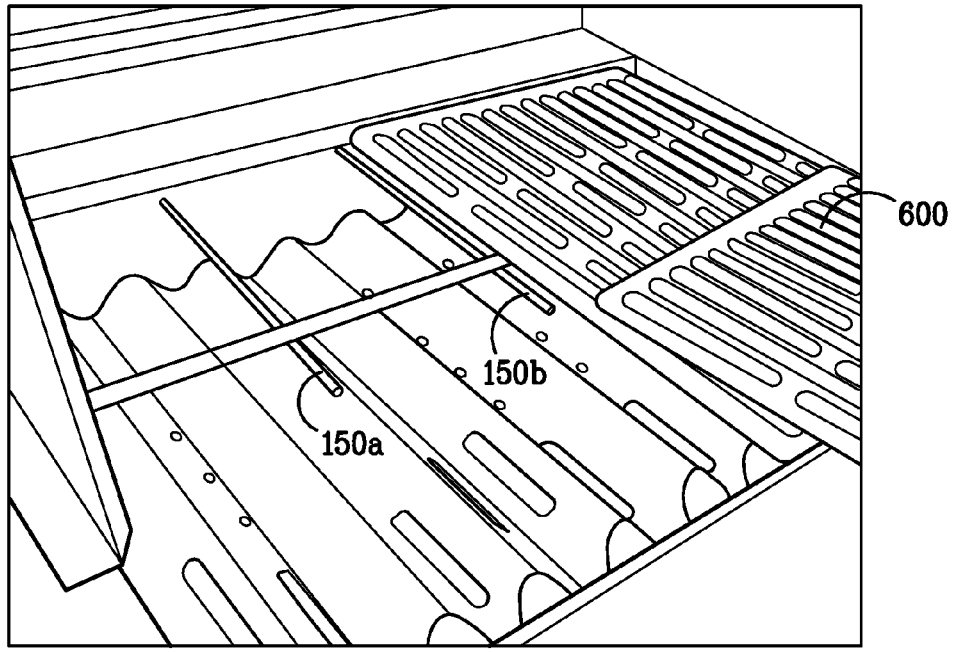
FIG. 6 is an exemplary illustration of a portion of the gas grill of FIGS. 1A and 1B.

FIG. 1A illustrates a front view of an exemplary gas grill 100. FIG. 1B is a schematic top view of the grilling area 140 of grill 100 with the cover removed. The grill 100 may be any suitable grill having any suitable size and/or shape. In the exemplary embodiments the grill 100 is described as a gas grill that is capable of using liquid propane (LP) or natural gas as a fuel source. In alternate embodiments, the grill 100 may use any suitable fuel source. In one exemplary embodiment, the grill flames and/or temperature are automatically controlled through a control unit of the grill by controlling the fuel input rate to the burners 910-912 (see FIG. 9). The grill 100 may also include manual controls so that a user of the grill 100 can manually control the grill flames and/or temperature in conventional fashion. The grill 100 may include any suitable heat sensing devices or temperature sensors such as, for example, resistance thermal devices (RTDs). RTDs, such as RTDs 150a-150c, are installed in close proximity or adjacent to the grilling/cooking surface so that each cooking zone within the grilling area has its own RTD (see e.g. FIG. 6 illustrating RTD 150a, 150b located, for example, underneath the grilling racks 600). In alternate embodiments one or more cooking zones may share an RTD. As the grill burner ignites the fuel, the grill temperature rises and depending on the rate of combustion and steady state thermal condition of the grill 100, the grill temperature will rise or fall. In one exemplary embodiment, prior to grilling, the user sets a predetermined grill temperature (e.g. the grill temperature set point 310; see FIG. 3) that the grill 100 should reach and maintain throughout cooking. Inputs from the RTDs 150a-150c to the grill control unit 330 (see FIG. 3) are evaluated and compared against the grill temperature set point. The control unit 330 is configured to change the combustion rate of the fuel via suitable fuel flow valves. When the grill temperature set point is reached, the control unit 330 may notify the user via any suitable audible or visual alerts that the grill is preheated and ready for use.

The gas grill control system described herein may also provide for flare-up sensing/turndown, remote sensing, flame sensing and auto-turndown. Flare-ups on gas grills are common and occur when grease and food byproducts drop or collect on the grill burners/flames. The increased flames from these flare-ups generally propagate upwards and can burn the food that is being grilled. Flare-up sensing in accordance with the exemplary embodiments actively monitors the grill temperature gradients using the RTDs (more specifically, when the reading of the RTD exceeds a predetermined temperature, then the control unit 330 will conclude that there is a flare-up) so that when a flare-up occurs, the combustion rate of the fuel will be turned down to, for example, a lower setting or even completely off to permit the flame to dissipate. Once the temperature returns to normal (e.g., the grill temperature set point), the fuel control valves would return to an optimum setting as determined by the control unit 330. Remote sensing, as will be described in greater detail below, allows a user to obtain feedback from the grill while the user is located in an area remote from the grill such as, for example, when the user walks away from the grill and enters a building structure. During remote sensing, the control unit 330 may be configured to send out suitable wireless signals to a remote device located in the vicinity of the user to identify to the user the condition or status of the grill and/or food being cooked. Flame sensing to detect or verify the presence of the flame or to detect loss of flame, can be achieved in any suitable manner such as, for example, by noting drastic, unexpected temperature drops during use.

Referring still to FIGS. 1A and 1B, the grill 100 may include a base 120, a user interface unit or control panel 110, a hood 130 and a grilling area 140. The base 120 may have any suitable shape and size for supporting and at least partially housing the cooking area of the grill 100. It is noted that the base shown in the figures and described herein is merely exemplary in nature and that the base may have any other suitable features and/or components. In this exemplary embodiment, the base 120 is in the form of a cabinet. The cabinet may be configured with a storage area for storing, for example, a portable fuel supply 170, an electrical power source 161 (e.g., battery or other electrical power means) for operation of the grill igniter and/or control system, and housing any suitable components of the grill 100. In other exemplary embodiments, the grill 100 may include a power cord 160 in lieu of the electrical power source 161 and/or a fuel line 171 for coupling the grill 100 to a stationary or non-portable fuel source. The hood 130 may be suitably hinged to the base between an open and closed position (see e.g. FIG. 14) to allow for access to the grilling area 140. The grilling area 140 may include any suitable number of grilling zones 140a-140c such that each grilling zone has its own temperature control. Each grilling zone 140a-140c includes an RTD 150a-150c located adjacent to its respective grilling surface. The temperature/flame of each grilling zone 140a-140c is controlled through the user interface unit 110 as will be described in greater detail below.

Figure 2:
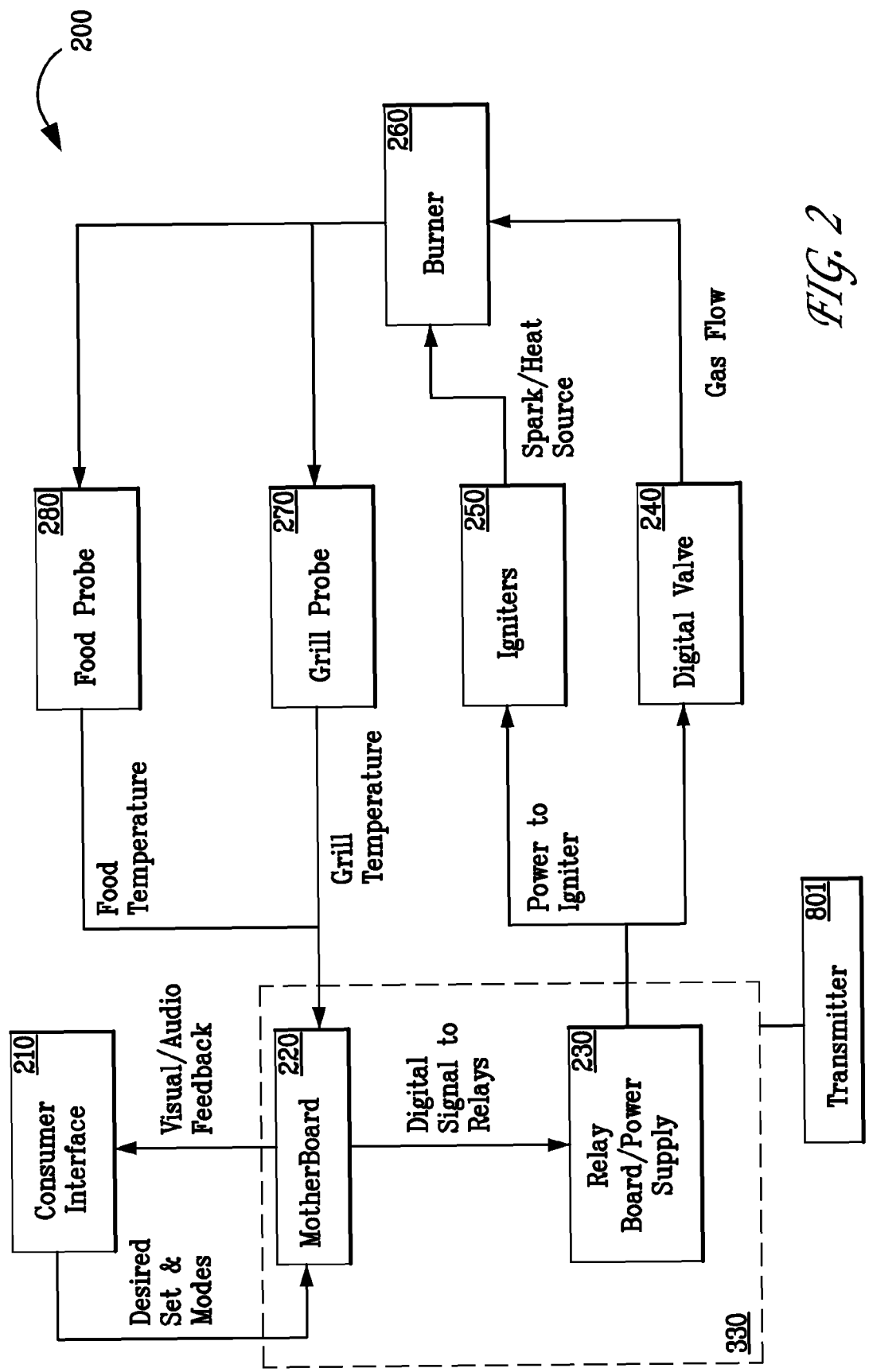
FIG. 2 is a schematic block diagram of the gas grill of FIGS. 1A and 1B.
Figure 3:
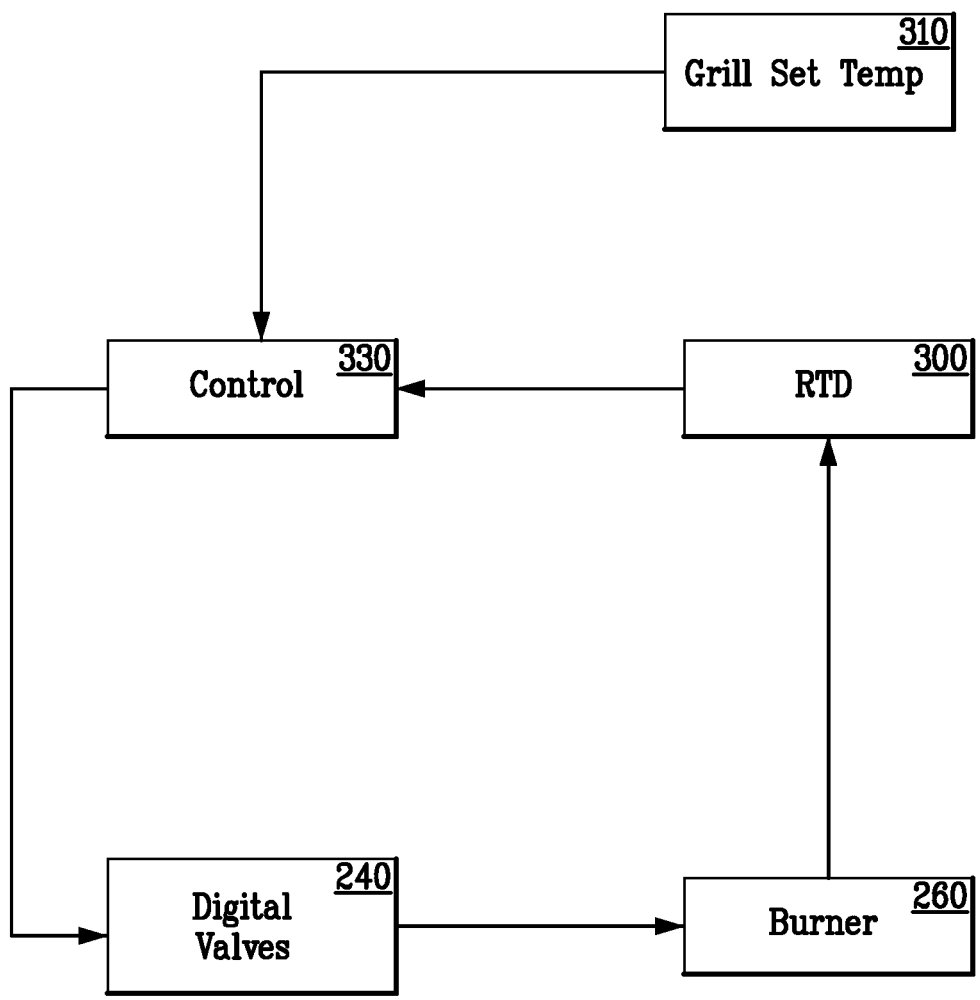
FIG. 3 is a schematic block diagram of a control system for the gas grill of FIGS. 1A and 1B.

Referring to FIGS. 2 and 3, an exemplary configuration of the grill control system 200 will be described. As described above, the grill 100 includes a control unit 330 that is connected to a user interface unit or control panel 210. The control unit 330 may include a motherboard or processor 220, a relay board/power supply 230, a memory and other suitable electronics/components and programming for carrying out the control of the grill 100 as described herein. Digitally or electronically controlled fuel flow valves 240, such as solenoid valves, and igniters 250 are connected to the relay board 230 which are in turn connected to the burner(s) 260 for each cooking zone 140a-140c. The igniters 250 may be any suitable igniters such as for example, spark igniters or glow bars. The RTDs may be connected to the control unit 330 and be connected to or located in close proximity or adjacent to the cooking surface of the grill 100, the burners 260 and/or the food being cooked. The RTDs in this exemplary embodiment include grill temperature probe(s) 270, which may be substantially similar to the RTDs 150a-150c, and the food temperature probe(s) 280. In operation, the user sets the grill temperature set point 310 in the control unit 330 through the user interface unit 210. The control unit 330 operates the electronically controlled valves 240 through, for example, the relay board 230. The igniters 250 cause the fuel flowing from the valves 240 to ignite. The control unit 330 can monitor the temperature of the grill to check for ignition and operate the igniters 250 accordingly until combustion of the fuel is achieved. The amount of fuel flowing into the burners 260 from the valves 240 causes the combustion of fuel in each cooking zone to be adjusted so that the grill temperature set point 310 is reached. Before the grill temperature set point 310 is reached, the combustion of fuel may be controlled at the maximum power or fuel setting. Once the grill temperature set point 310 is reached, the combustion (e.g. flames) at each burner are modulated between suitable power levels, such as the maximum power level and a minimum power level (e.g. the lowest amount of fuel supplied to the burner to maintain a flame), depending on whether the grill temperature is above or below the grill temperature set point 310. Where the grill temperature is above the grill temperature set point 310 the minimum power level is used and when the grill temperature is below the grill temperature set point 310, the maximum power level is used. The term power level is used for exemplary purposes only to describe, for example, the intensity of the combustion at the burner such that the maximum power level indicates the highest level of combustion and the minimum power level indicates the lowest level of combustion without the burner 260 being shut off or extinguished. The temperature of the grilling zone and/or food being cooked is monitored by the grill temperature probe 270 and/or the food temperature probe 280 which send corresponding signals to the control unit 330 so that the grill temperature set point 310 can be maintained as described herein. In the event of a thermal condition such as a flare-up, the control unit 330 would extinguish the flames of the burners by stopping a flow of fuel into a respective one of the burners 260 until the temperature of the grill, as detected by the RTDs, dropped below the grill temperature set point 310 at which point the burner would be re-ignited to maintain the grill temperature set point 310. During re-ignition of the burners 260 the control unit 330 may periodically monitor flame presence through established flame sensing methods such as electronic reigniters that sense voltage changes from the igniter to ground when the flame is present or local temperature sensors located near the gas burner flame ports.

Referring now to FIGS. 4A and 5A-5E, an exemplary user interface unit will be described. It should be noted that in one example, a user interface may be presented through any suitable display, such as a liquid crystal display, of the user interface unit 210 and may be a "virtual user interface unit" (e.g. no physically turnable knobs or physically depressable buttons) such that operation of the user interface unit is through, for example, touch capabilities of the display and/or a keypad 111. In other examples, the user interface unit may include a combination of a virtual user interface unit and a physical user interface unit where the user interface unit includes, for example, a touch enabled display, physically turnable knobs, physically depressable buttons and/or any suitable visual display for conveying information to the user. In still other examples the user interface unit may be a physical user interface unit including physically turnable knobs and/or physically depressable buttons (or any other suitable analog mechanical device) and visual information as will be described below with respect to FIG. 4B. It is noted that the analog mechanical devices (e.g. knobs and buttons) are connected to the control unit 330 in any suitable manner where their analog signal may be converted to a digital or electronic signal for controlling a respective setting of the grill as described herein.

Figures 2, 4A:
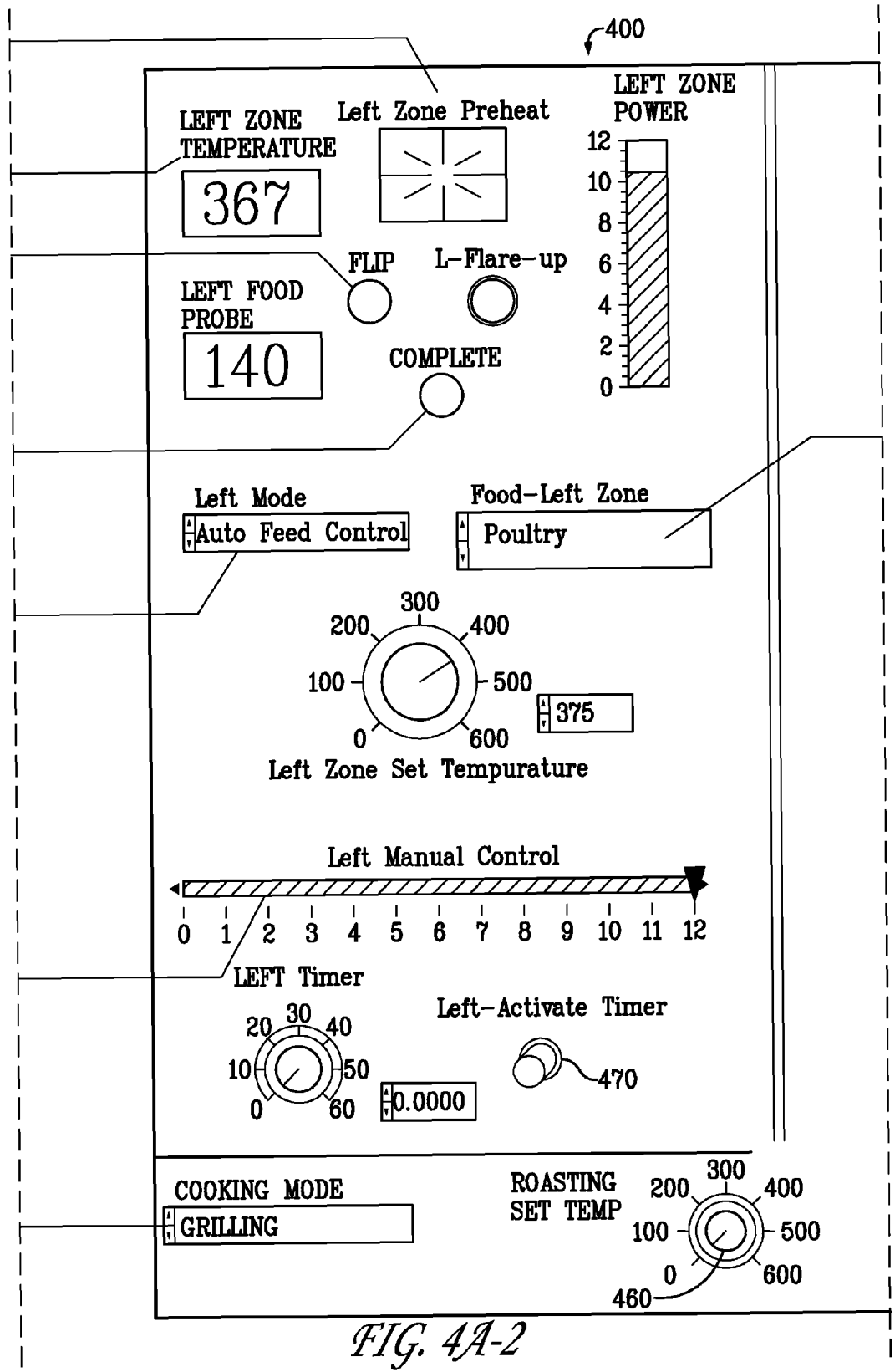
Figures 3, 4A:
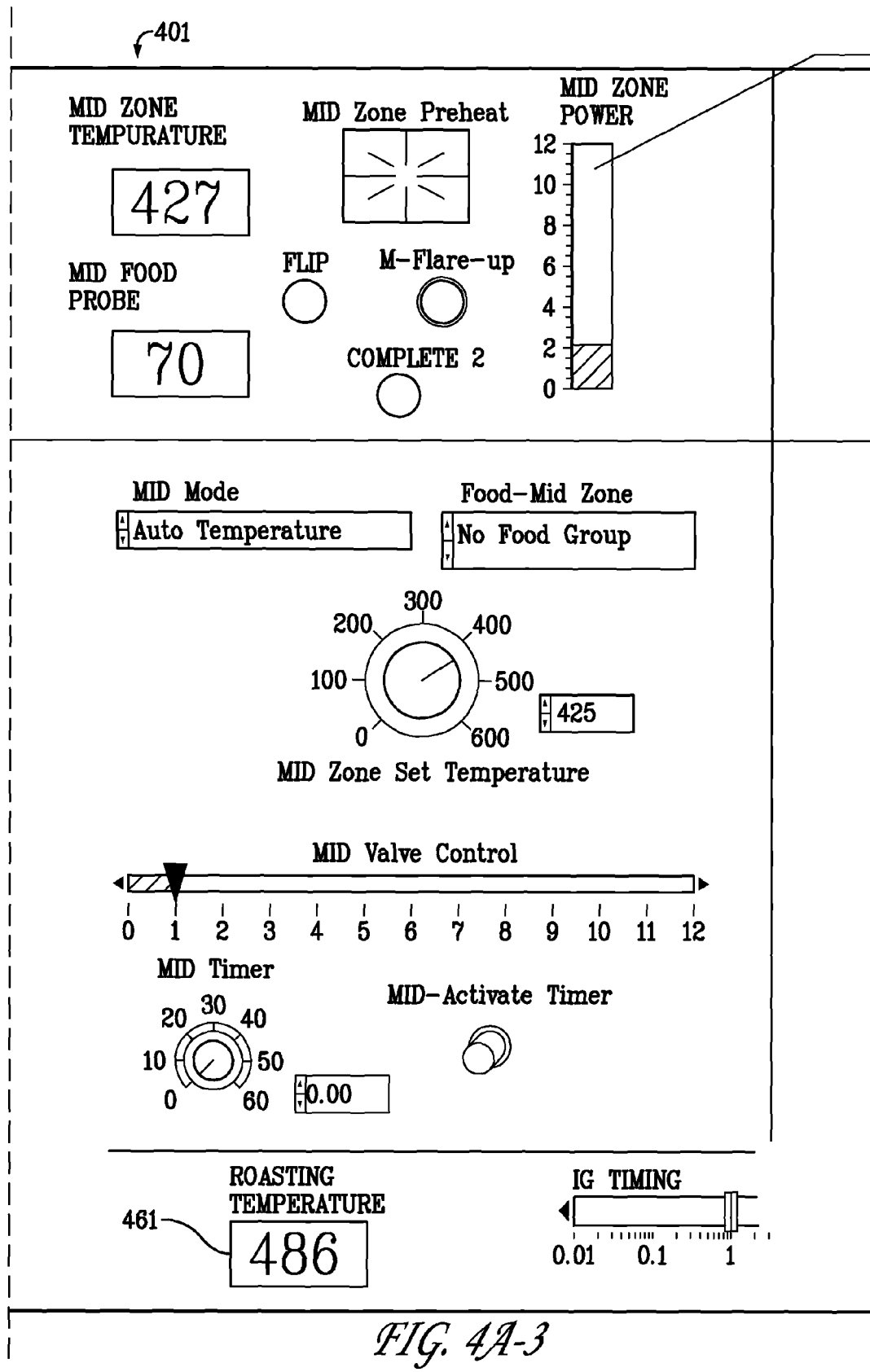
Figures 4, 4A:
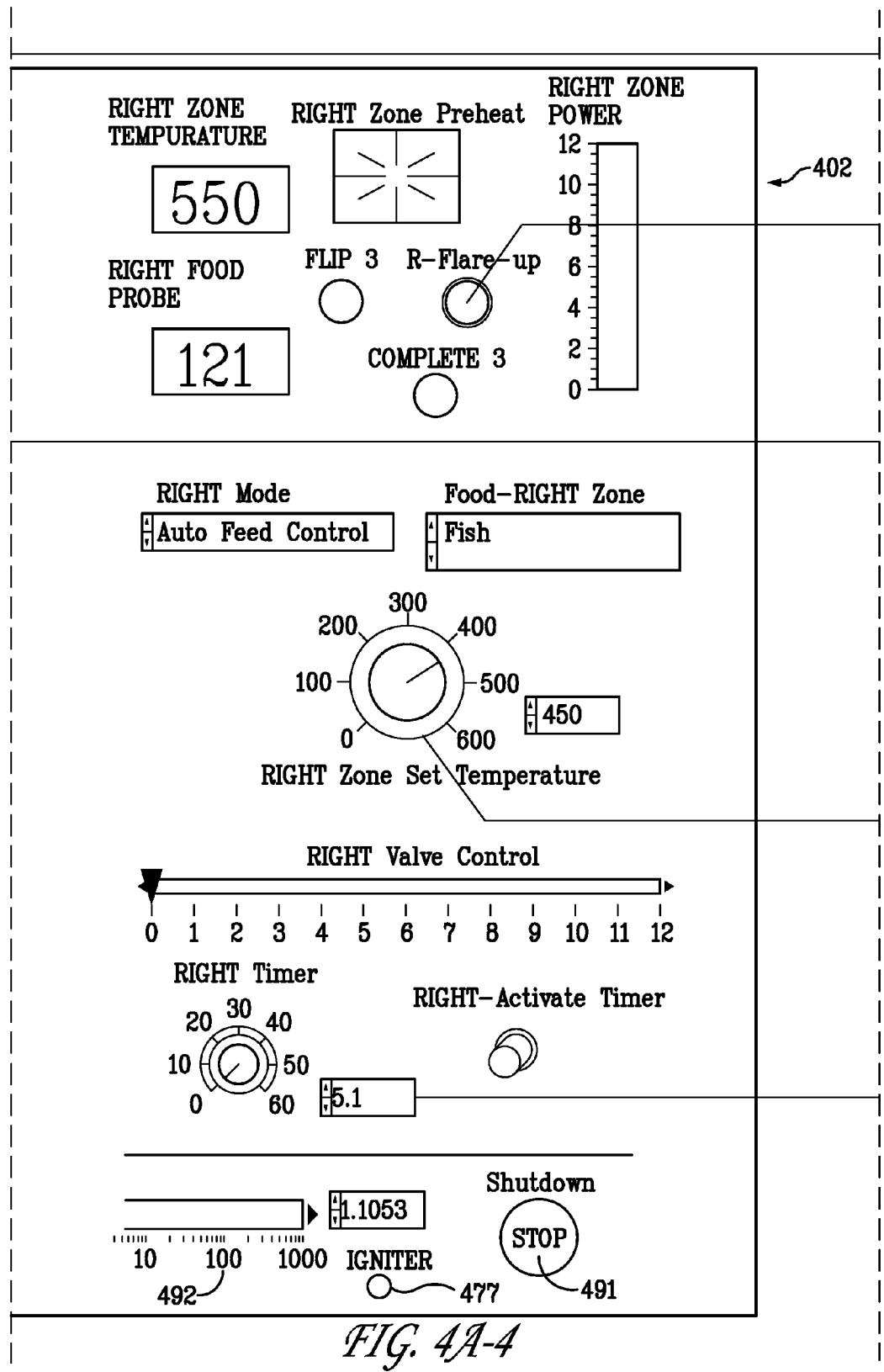
Figures 4, 4A, 5:
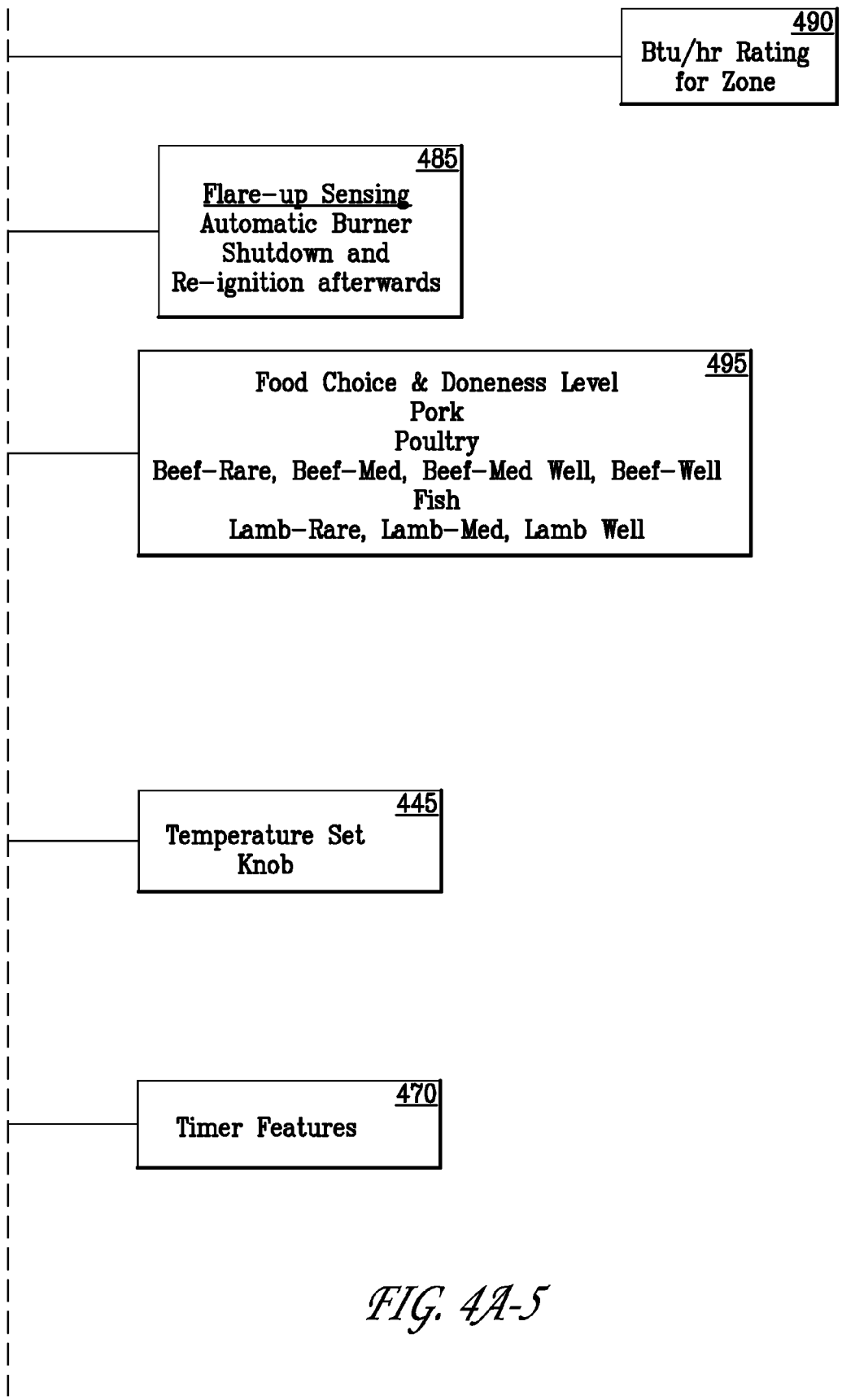

As can be seen in FIG. 4A, the user interface unit includes a control section for each cooking zone. In this example there are three cooking zones 140a-140c (although in other examples there may be more or less than three zones) corresponding respectively to control sections 400-402. In this exemplary embodiment, the controls for each control section 400-402 are substantially the same but in alternate embodiments the controls for each control section 400-402 may be different from each other. In this exemplary embodiment, each control section 400-402 includes a zone temperature indicator 410 for indicating the actual grill temperature at a respective zone, a preheat indicator 480, a temperature set control knob 445, a food choice indicator 495, a heating rate indicator 490, a time-to-flip indicator 415, a flare-up indicator 485, a time to remove food indicator 420, a grilling mode indicator 430, a manual control indicator 440, and timer controls 470. The user interface unit may also includes a grill use selector 450 (e.g. grilling, roasting, rotisserie, cleaning, etc.), a roasting control 460, a roasting temperature display 461, and a shut down control 491. It should be noted that the controls and indicators shown in the figures are for exemplary purposes only and in alternate embodiments the user interface unit may have any suitable controls and/or indicators. The indicators may be any suitable visual and/or audible indicators such as for example, any suitable combination of sounds, lights, slider bars and digital readouts. The user interface unit may also include a fuel level monitor for monitoring a level of fuel within, for example, the portable (or stationary) fuel supply 170.

Figure 5A:
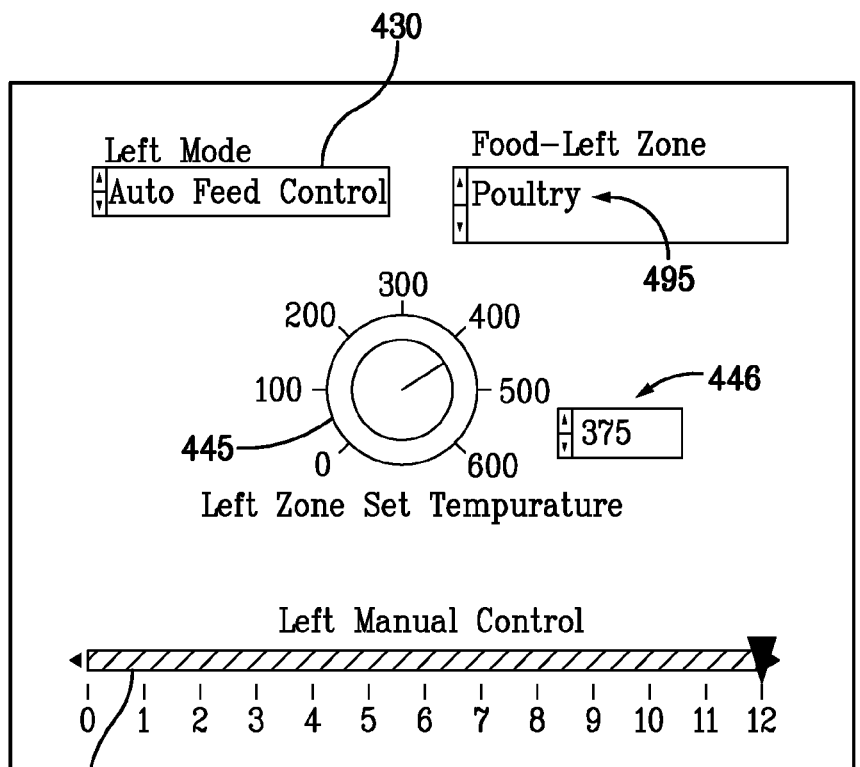
FIGS. 5A-5E are schematic illustrations of portions of the exemplary user interface unit of FIG. 4A.
Figure 5B:
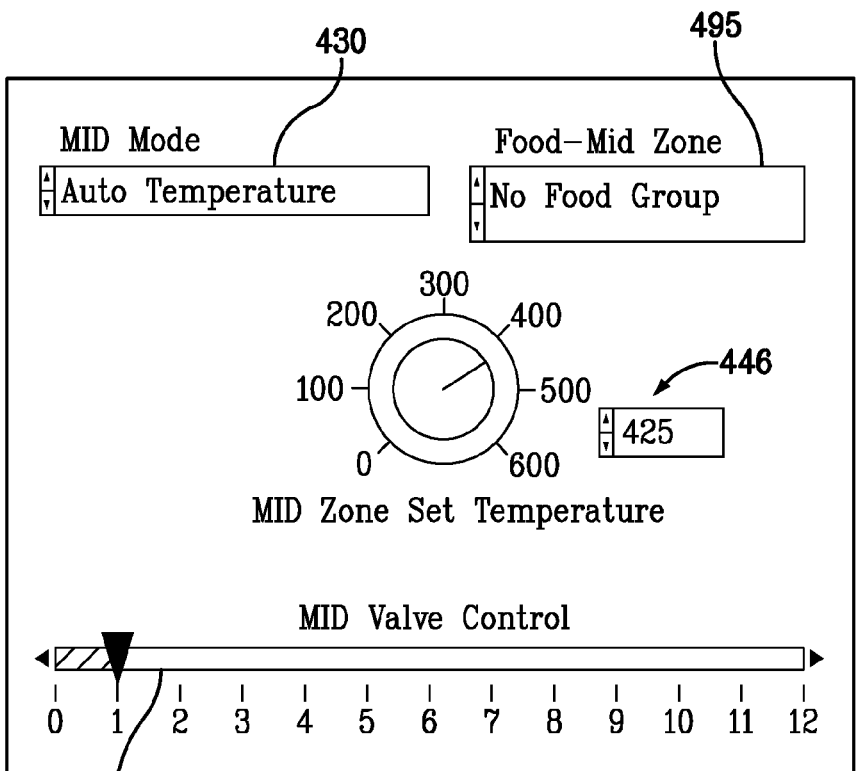

Referring to FIGS. 5A, 5B, the grill temperature controls will be described in greater detail. As can be seen in FIGS. 5A, 5B, the grill temperature set point 310 is set through temperature set control knob 445. In this exemplary embodiment, the control knob may be a physical knob that is grasped and turned by the user for setting the grill temperature. As the temperature set control knob 445 is turned the grill temperature set point 310 is displayed on digital readout 446. In alternate embodiments, the user interface unit may not include digital readout 446 where the temperature is set, using the temperature gradations located adjacent the temperature set control knob 445. The temperature set control knob 445 for setting the grill temperature set point 310 may be used in conjunction with an automatic temperature setting of the grill as indicated in the grilling mode indicator 430 as shown in FIG. 5B. The automatic temperature setting is configured to modulate the combustion of the respective grilling zone burner so that the grill temperature set point 310 is maintained. Another grilling mode includes a food optimized or automatic food control mode where a food type (e.g. poultry, pork, beef, fish, etc.) may be selected using the food choice indicator 495 so that the temperature of the grill is automatically maintained at a predetermined programmed temperature for cooking the selected food type as can be seen in FIG. 5A. The grill may also include a manual grilling mode where the temperature of the grill can be manually adjusted through, for example, the manual control indicator 440 such as a slider bar or other suitable control that allows the user to adjust the valve 240 settings at any given time during grilling for controlling the rate of combustion and amount of fuel delivered to the respective grilling zone burner.

Figures 1, 5C:
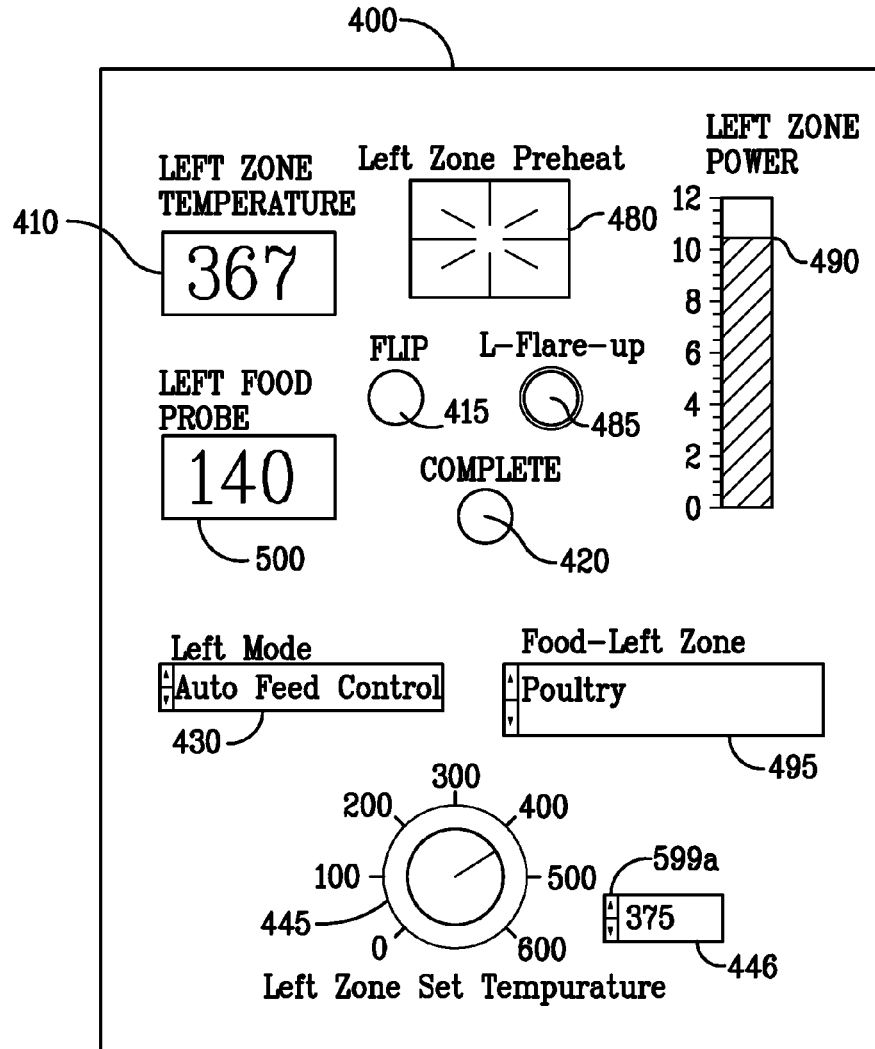
Figures 2, 5C:
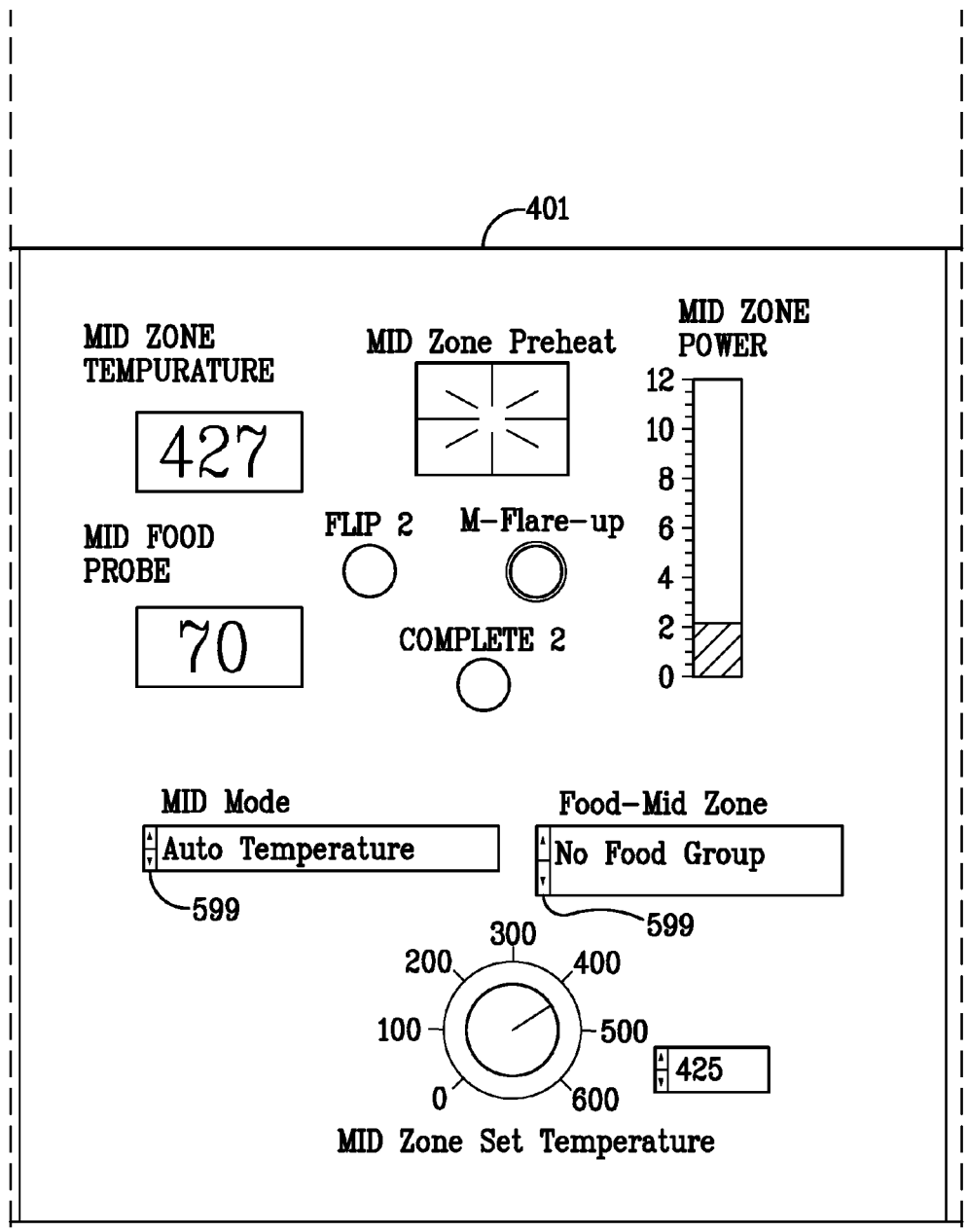
Figures 3, 5C:
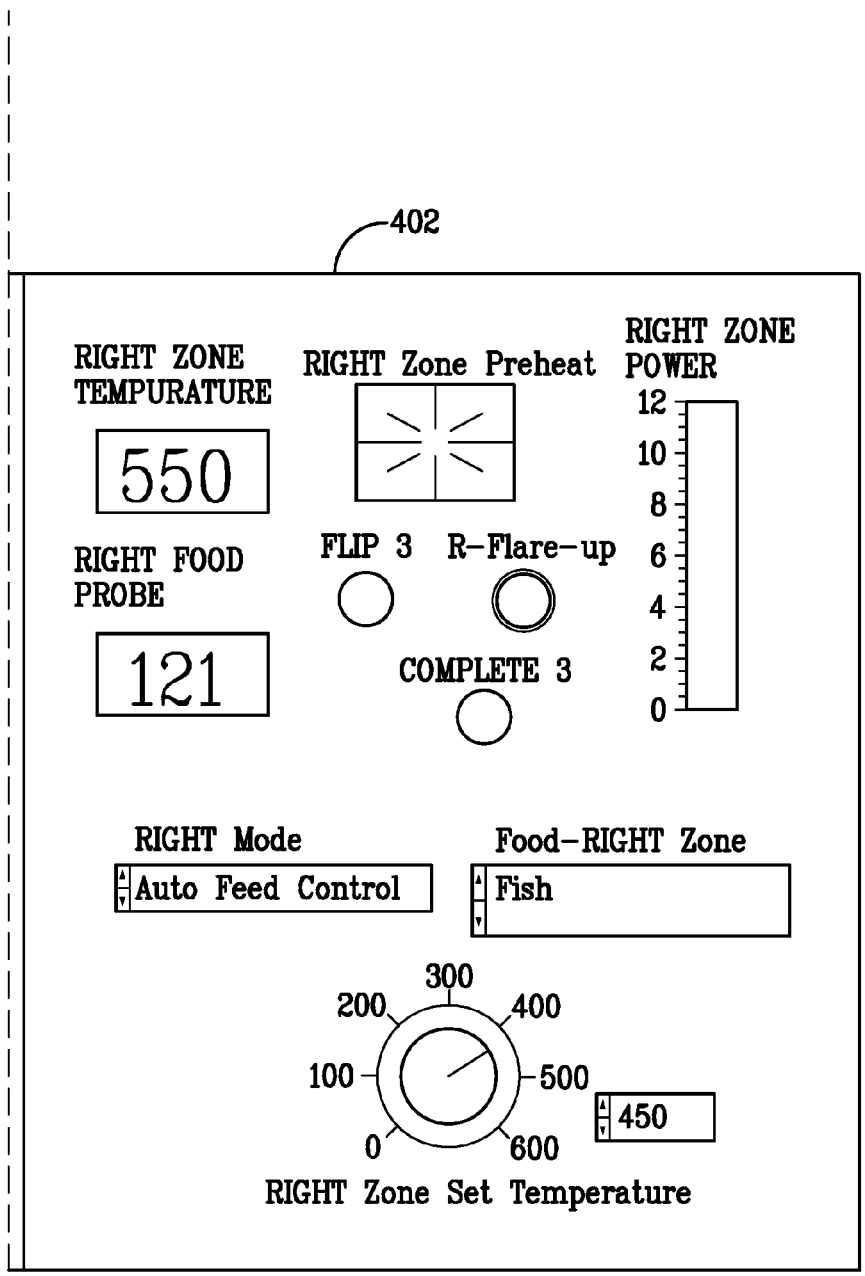
Figure 5D:
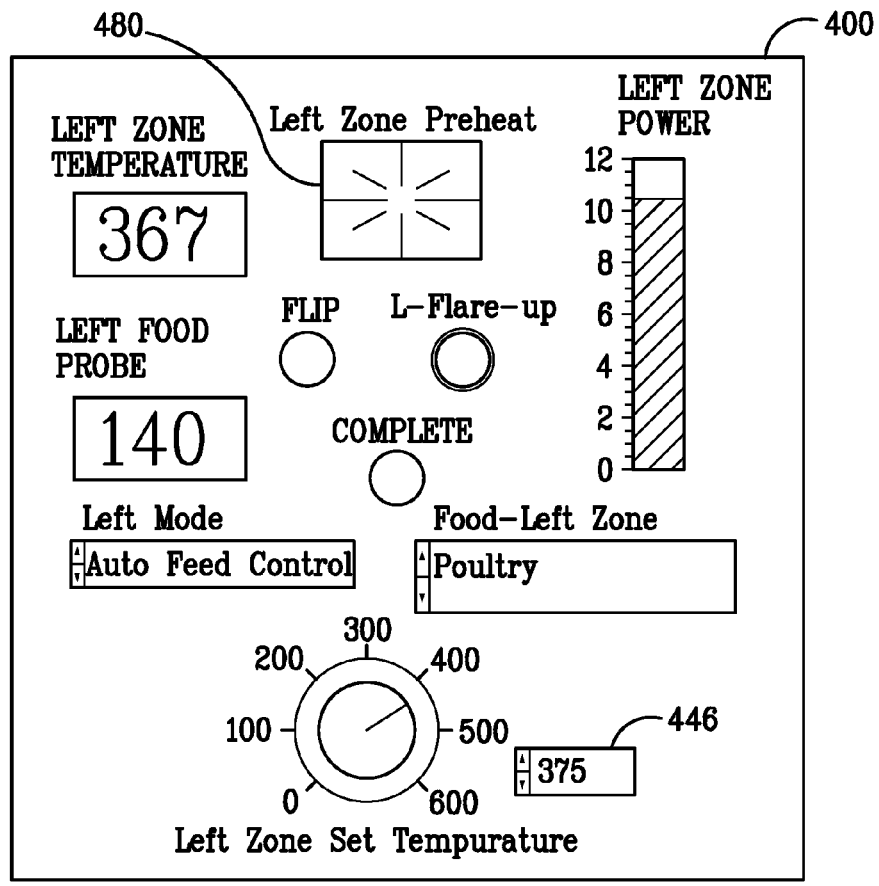

Referring to FIGS. 5C and 5D, the grill status indicators for each user interface unit section 400-402 will be described in greater detail. The grill status indicators include the temperature of each grilling zone as indicated by the zone temperature indicator 410 and a food probe temperature 500, each shown in their respective digital readouts. The food probe temperature 500 is obtained from the food temperature probes for indicating the temperature of the food being cooked in the respective grilling zone. The grill status indicators may also include visual indicators and/or audible tones generated by, for example, any suitable speaker of the user interface unit for indicating the respective grilling zone is preheated (pre-heat indicator 480), that there is a flare-up (flare-up indicator 485), that it is time to flip the food (time-to-flip indicator 415) or that the cooking of the food is completed (time to remove food indicator 420). An indicator of the valve settings or power (heating rate indicator 490) may also be included for use, when for example, the grilling mode is set to an automatic mode.

Figure 5E:
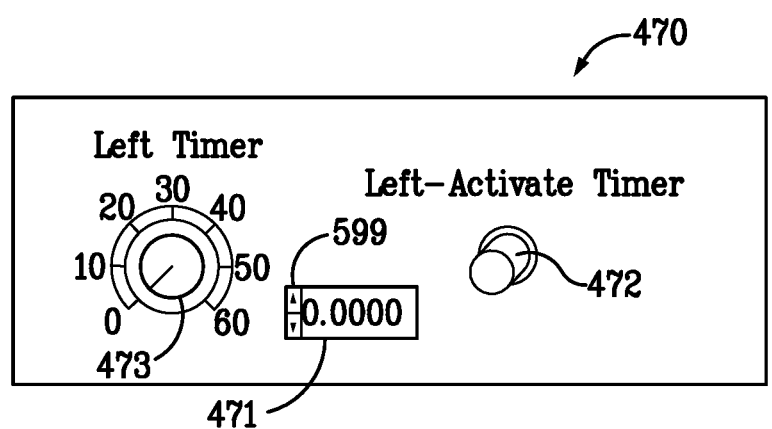

Referring to FIG. 5E, exemplary timer controls 470 for each of the user interface unit sections will be described. In this exemplary embodiment, the timer controls include a timer in the nature of a knob 473 for setting the timer and preferably a display 471 for displaying the set time to the user. A timer activation control 472 is also preferably provided for starting and/or stopping the timer.

Referring back to FIG. 4A, in this exemplary embodiment the roasting settings may include a roasting control (i.e., the roasting temperature set point knob) 460 and a roasting temperature display 461 substantially similar to temperature set control knob 445 and temperature display 446 described above. The roasting settings/controls may also include a timer substantially similar to the timer 470 described above.

In this exemplary embodiment the grill user interface unit may also include an igniter activation control 477 (e.g., a physical or virtual knob or button) to allow a user to manually ignite the grill burners. An ignition timing control 492 may also be provided on the user interface unit for controlling the duration of, for example, the igniter spark or igniter operation. It is noted that when the grill is operated in an automatic mode the control unit 330 may be configured to automatically ignite the burner of the respective cooking zone being used.

As described above, it is noted that the user interface unit may be a virtual user interface unit without any physical knobs, sliders or buttons for a user to adjust. It is noted that suitable controls, such as for example, toggle buttons 599 (virtual or physical) may be located adjacent to a corresponding grill setting control to allow the user to select or enter the grill setting. For example, to set the grill temperature set point 310 the user may touch a portion of, for example the touch enabled control screen at a location corresponding to toggle button 599A (FIG. 5C) so that the temperature settings may be scrolled through until the desired temperature is displayed. The other grill settings may be set in a substantially similar manner.

Referring now to FIG. 4B, another exemplary user interface unit is shown. In this exemplary embodiment, the user interface unit includes a simplified configuration including two physically turnable control knobs 498, 499 for each user interface unit section 400-402 for controlling a respective grilling zone. In this example, the control knob 498 may be turned or rotated by the user to place the set the grill mode in one of an automatic mode or a manual mode. In the manual mode, the user may rotate the knob from the off position 498D to a position between the "lo" and "hi" burner settings 498A, 498B for manually controlling the valves 240 for adjusting the intensity of the burner flames. In the automatic mode the user may turn the control knob 498 from the off position 498D to the automatic position 498C which activates the knob 499. The control knob 499 may be rotated by the user to any automatic grilling mode such as those described above. For example, the control knob 499 may be used to set the grill temperature set point 310, to a cleaning mode (e.g. the highest temperature setting to assist in cleaning, for example, grease and food residue from the grill) or a warming mode so that food can be placed within the grill and kept warm. As can be seen in the figure, the temperature gradations surrounding control knob 499 may also include food indicators to aid the user in selecting a temperature for grilling. For example the food indicators may include pictures of steak, chicken and ribs or any other food item. It should be understood that the control knobs 498, 499 are connected to the control unit 330 so that the control unit can operate the valves 240 in the manner described herein.

Figure 7:
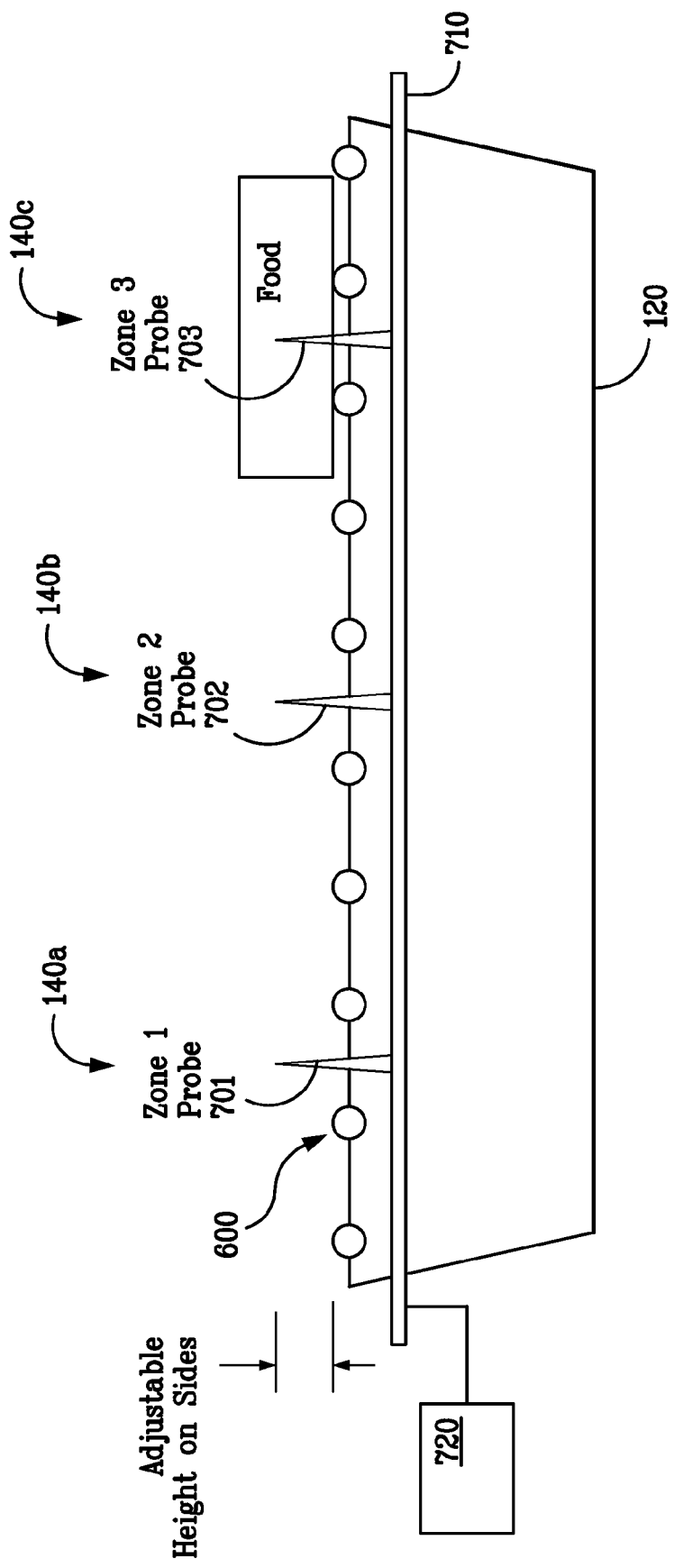
FIG. 7 is a schematic cross-sectional illustration of a portion of the gas grill of FIGS. 1A and 1B.

Referring now to FIG. 7, an exemplary cross section of a portion of the grill 100 is shown in accordance with an exemplary embodiment. In FIG. 7, a portion of the base 120 is shown with the grilling rack 600 installed therein. In this exemplary embodiment, three food temperature probes 701-703, substantially similar to the food temperature probes 280, are shown corresponding to the three grilling zones 140a-140c for exemplary purposes only and it should be understood that in alternate embodiments there may be more or less than three food temperature probes where each grilling zone may have any suitable number of food temperature probes. In this example, the food temperature probes 701-703 are mounted on a moving member 710. The moving member 710 may be connected to an adjustment mechanism 720 so that the height of the food temperature probe tips above the rack 600 may be adjusted. The adjustment mechanism 720 may be any suitable device such as, for example, a hand operated crank or an electric motor with suitable transmissions for raising and lowering the moving member 710 and the food temperature probes 701-703 relative to the rack 600. Here the food temperature probes 701-703 move as a unit but in alternate embodiments each probe may be mounted to a separate movable member so that the height of each probe can be individually adjusted. It is noted that in alternate embodiments the rack 600 may be moveable in a manner substantially similar to that described above with respect to the food temperature probes 701-703 so that the distance between the food and the burner flames can be adjusted.

The probes 701-703 may be suitably shaped so that as the probe tips are raised above the rack 600, the probes 701-703 penetrate into the food (for obtaining a temperature measurement of the food) without substantially lifting the food off of the rack 600 during penetration. Where the raising and lowering of the food temperature probes 701-703 is through an electronic adjustment mechanism, the control unit 330 may be configured to raise and lower the food temperature probes 701-703 at any suitable times for obtaining the temperature of the food. In one example the food temperature probes 701-703 may be inserted into the food when the food is placed on the rack 600 (e.g. there may be sensors for sensing food on the rack, which trigger the control unit to raise the food temperature probes). In another example, the food temperature probes 701-703 may be inserted into the food at predetermined time intervals, when the grill hood is closed, upon a user's request, or when a predetermined automatic grilling mode is selected. It should be understood that the food temperature probes 701-703 may be retracted below the surface of the rack 600 in any suitable manner to allow the user to flip the food on or remove the food from the rack 600. For example, when the grill indicates it is time to flip the food via the time-to-flip indicator 415 or that the cooking of the food is complete via the time to remove food indicator 420, the food temperature probes 701-703 may be automatically retracted by the control unit 330. In another example, the user may cause the food temperature probes 701-703 to be lowered in any suitable manner for flipping or removing the food. It is noted that in the example, shown in FIG. 7, the food temperature is measured at the probe tip so that a temperature reading is obtained from, for example a center of the food. The control unit 330 may be configured to raise the food temperature probes 701-703 by a predetermined amount so that the probe tips are located at a suitable location within the food based on, for example, information input into the control unit by the user or through any suitable programming for determining the coolest location within the food along a path of the probe as it is the coolest location within the food that takes the longest to cook. The food temperature probes 701-703 provide real-time feedback with respect to food temperature that can be used to determine flip or completion of grilling instruction based on, for example, user cooking selections. It should be understood that while the food temperature probes 701-703 are described above as being movable, in alternate embodiments the food temperature probes 701-703 may be stationary probes having a fixed height relative to the rack 600 for allowing the user to drop food directly on top of the food temperature probes 701-703.

Figure 8:
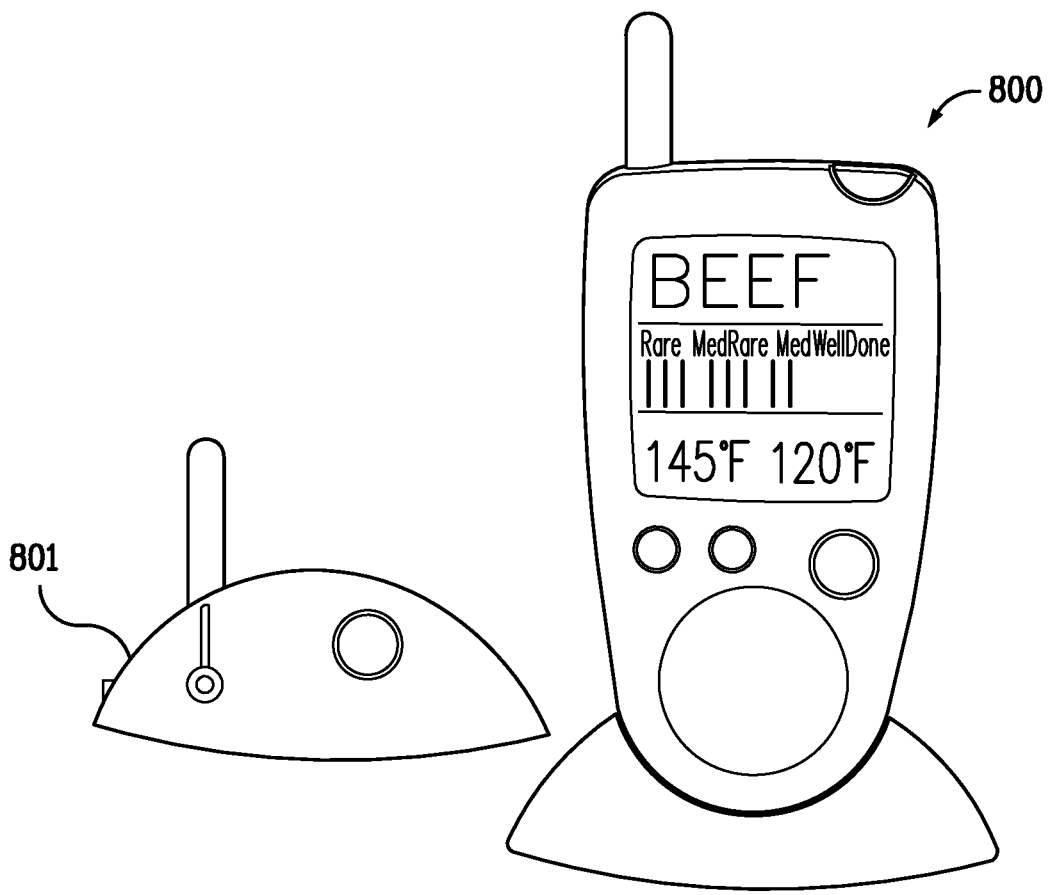
FIG. 8 is an exemplary illustration of a portion of a gas grill monitoring system in accordance with an exemplary embodiment.

Referring to FIGS. 2 and 8, as noted above, the grill 100 may include remote sensing capabilities. Any suitable transmitter 801 may be connected to the control unit 330 for transmitting signals pertaining to the functions or status of the grill 100 to a remotely located receiver 800. The transmitter 801 and the receiver 800 in this exemplary embodiment may be configured for wireless communication through any suitable wireless protocol such as, for example, Zigbee®, Bluetooth®, cellular, or other Radio Frequency or short range communication protocols. In alternate embodiments the transmitter 801 and receiver 800 may communicate through a wired communication link. The transmitter 801 may transmit any suitable information to the user pertaining to the operation of the grill including, but not limited to, temperature readings (e.g. food or grill), grill temperature set point, the grilling mode, the food type, timer indications, and flare-up indications. In alternate embodiments, the user may be able to remotely control the operation of the grill through the receiver 800 in a manner substantially similar to that described above with respect to the user interface unit of FIG. 4A. The control unit may also include a portable computer interface (wired or wireless) such that the grill can be controlled through the portable computer (e.g. laptop, handheld computer, etc.) via grilling software program(s) stored within the portable computer.

Figure 9:
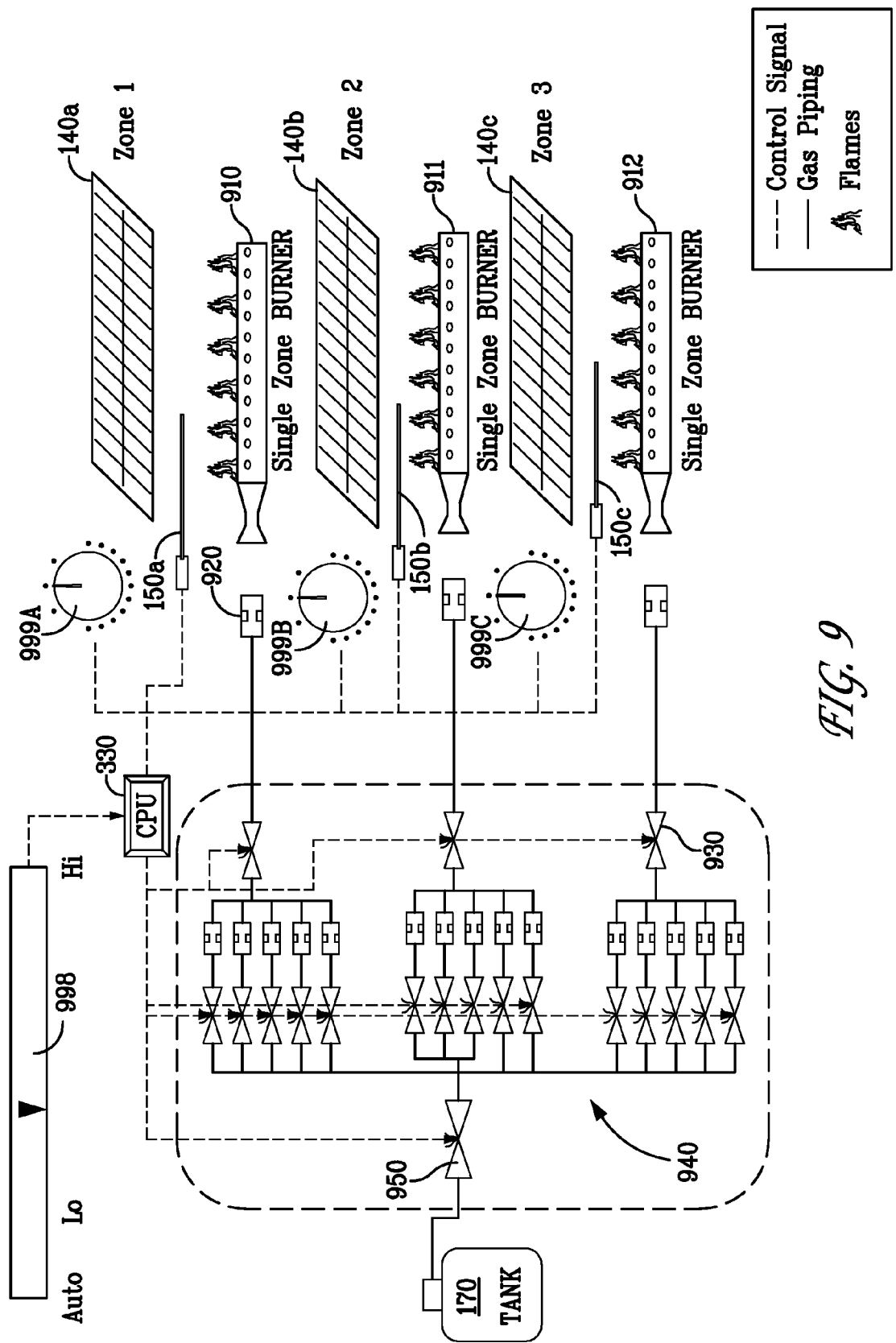
FIGS. 9-13 are schematic illustration of exemplary control system configurations for the gas grill of FIGS. 1A and 1B.

Referring to FIG. 9, an exemplary schematic diagram of a portion of control system for the grill 100 is shown in accordance with an exemplary embodiment. In this example, the control system utilizes a fully electronic user interface. In this example, control signals are sent from the user controls 998, 999A-999C to the control unit 330. The control unit 330 analyzes these control signals and controls the fuel flow valves 930-950 accordingly so that a desired amount of fuel is delivered to a respective burner 910-912 through a fuel orifice 920 located at an end of a respective burner 910-912. In this example, the fuel flow valves 930-950 are illustrated as a multi-solenoid valve but in alternate embodiments the valve (s) may be any suitable electronically controlled valves.

Figure 10:
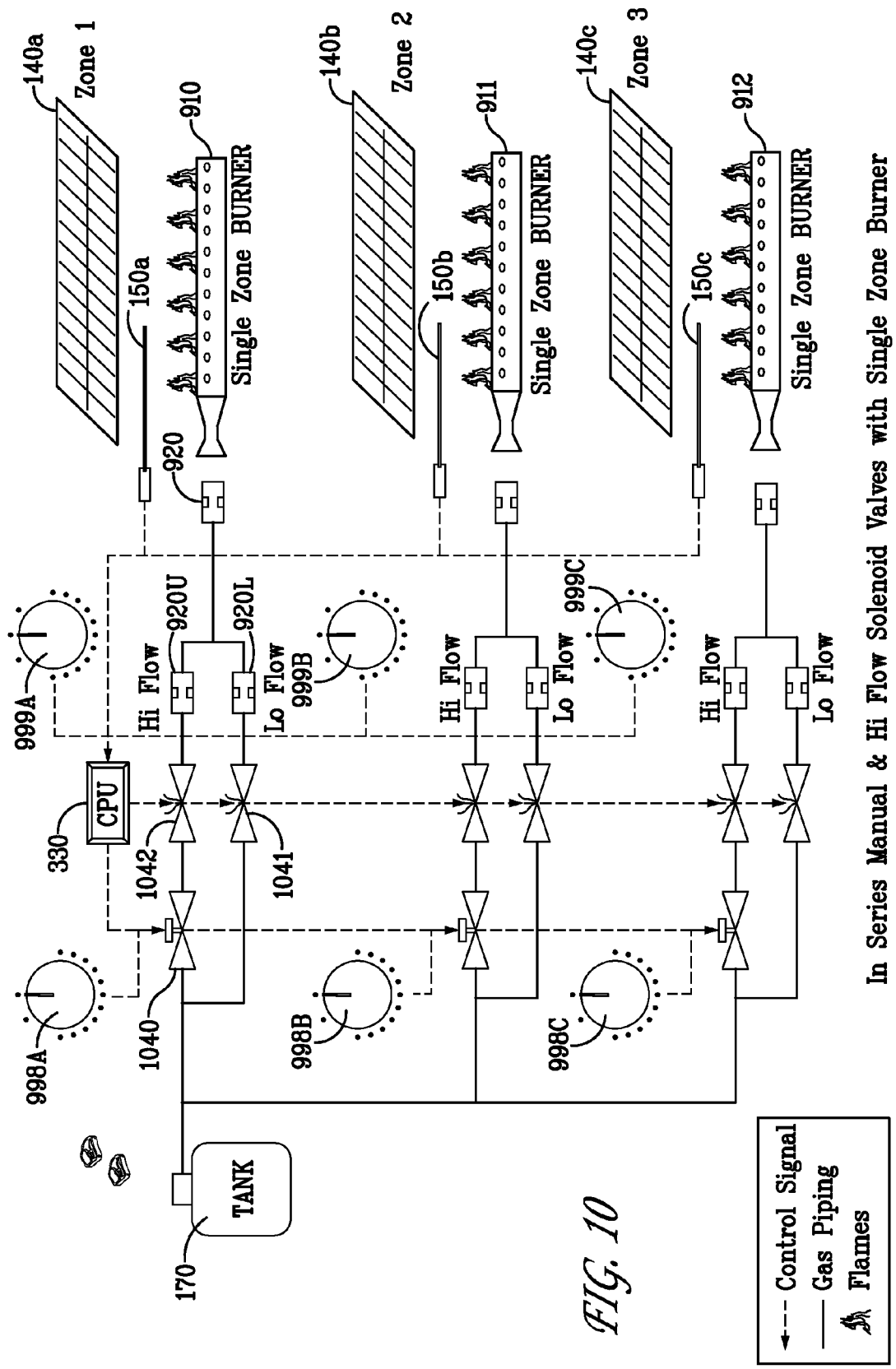

Referring to FIG. 10, another exemplary schematic diagram of a portion of control system for the grill 100 is shown in accordance with an exemplary embodiment. In this exemplary embodiment, a manually operated valve 1040 coupled with a potentiometer is used. In this example, the knob 998A may be coupled directly to the manually operated valve 1040 such that as the knob 998A is turned, the valve 1040 is opened or closed. The potentiometer on the valve sends a signal to the control unit 330 indicating the amount the valve is opened. A valve, such as, for example, a hi-flow solenoid valve 1042 is located downstream (e.g. in the direction of fuel travel) from the manual valve 1040 which directs fuel through a hi-flow fuel orifice 920U. The manual valve 1040 is supplied with fuel from a gas regulator attached to the portable fuel supply 170. The fuel supply is diverted upstream of the manual valve 1040 to another solenoid valve, low-flow valve 1041, which directs fuel through a low-flow fuel orifice 920L. The fuel from the hi-flow and low-flow orifices 920U, 920L are combined and directed toward the burner orifice 920 for introduction into the respective burner 910-912. In this example, the control unit 330 monitors the position of each valve and appropriately activates the valves according to the user selection input through controls 998A-998C and/or 999A-999C. If in the automatic mode, the control unit 330 will also evaluate the grill temperatures to determine when to energize the valves. In the manual mode both the valves 1041, 1042 are energized, while the fuel supplied by the manual valve 1040 passes through the hi-flow valve 1042.

Figure 11:
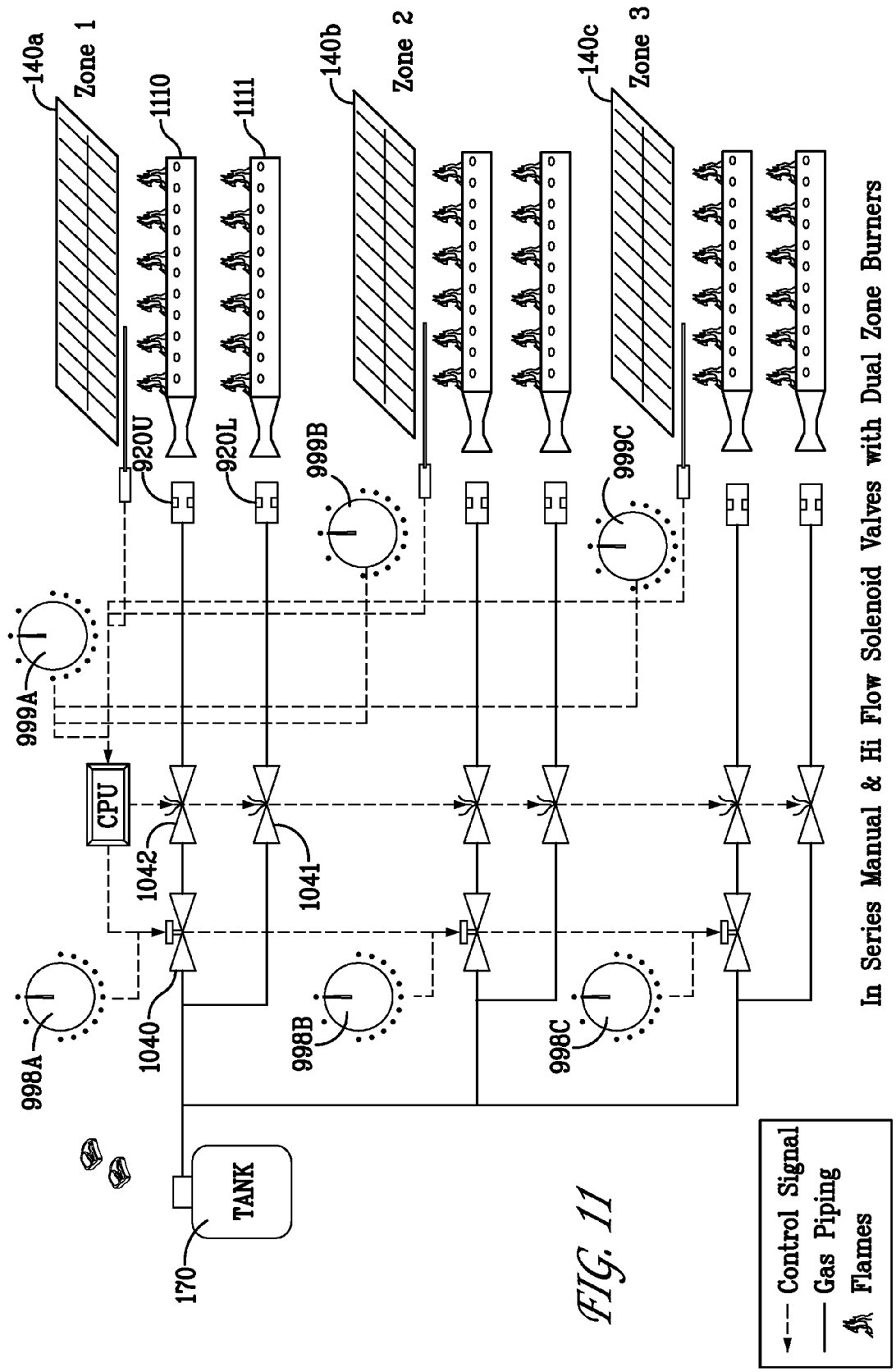

Referring now to FIG. 11, an exemplary schematic diagram of a portion of control system for the grill 100 is shown in accordance with an exemplary embodiment. The control system of FIG. 11 is substantially similar to the control system described above with respect to FIG. 10, but in this exemplary embodiment, the hi-flow orifice 920U directly feeds a hi-flow burner 1110 while the low-flow orifice 920L directly feeds a low-flow burner 1111 in lieu of mixing the two fuel flows into a single burner. It is noted that separate hi-flow and low-flow burners allows for an optimized burner design as the temperature range between the hi-flow and low-flow burners is much wider than a temperature range obtained with a single burner. For example, the dual burner arrangement (e.g. hi-flow burner, low-flow burner arrangement) provides for improved preheat and heat recovery times by boosting the gas flow into the hi-flow burner and also allows for lowering the gas flow into the low-flow burner for significantly affecting the minimum allowable grill set temperatures.

Figure 12:
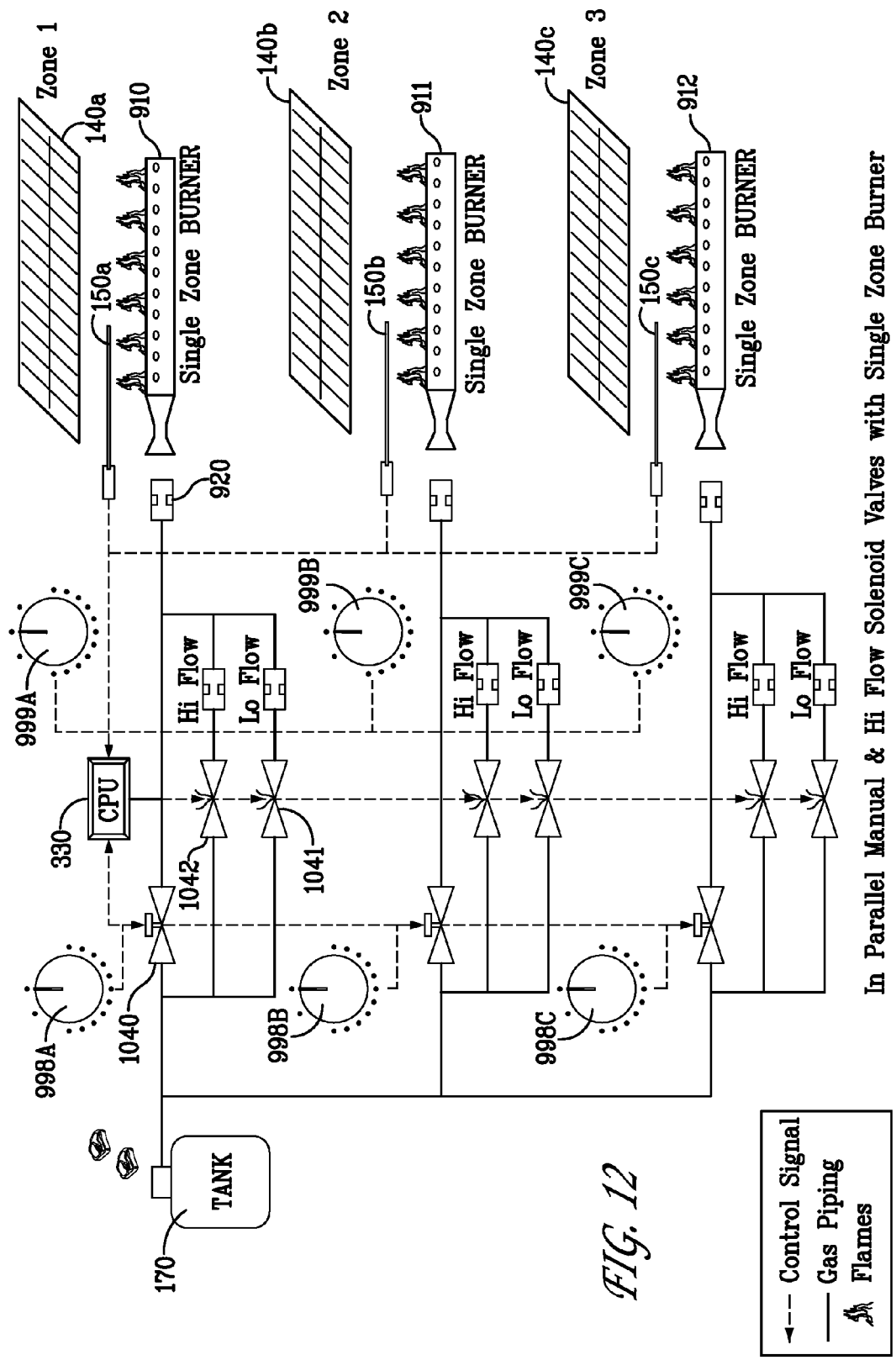

Referring to FIG. 12, yet another exemplary schematic diagram of a portion of control system for the grill 100 is shown in accordance with an exemplary embodiment. The control system of FIG. 12 is substantially similar to that described above with respect to FIG. 10. However, in this exemplary embodiment, the manual valve 1040 is run in parallel with the valves 1041, 1042 rather than in series as in FIG. 10. Here, when the control system is in the manual mode, neither valve 1041, 1042 is energized such that fuel flow is only directed through the manual valve 1040 to the burner orifice 920.

Figure 13:
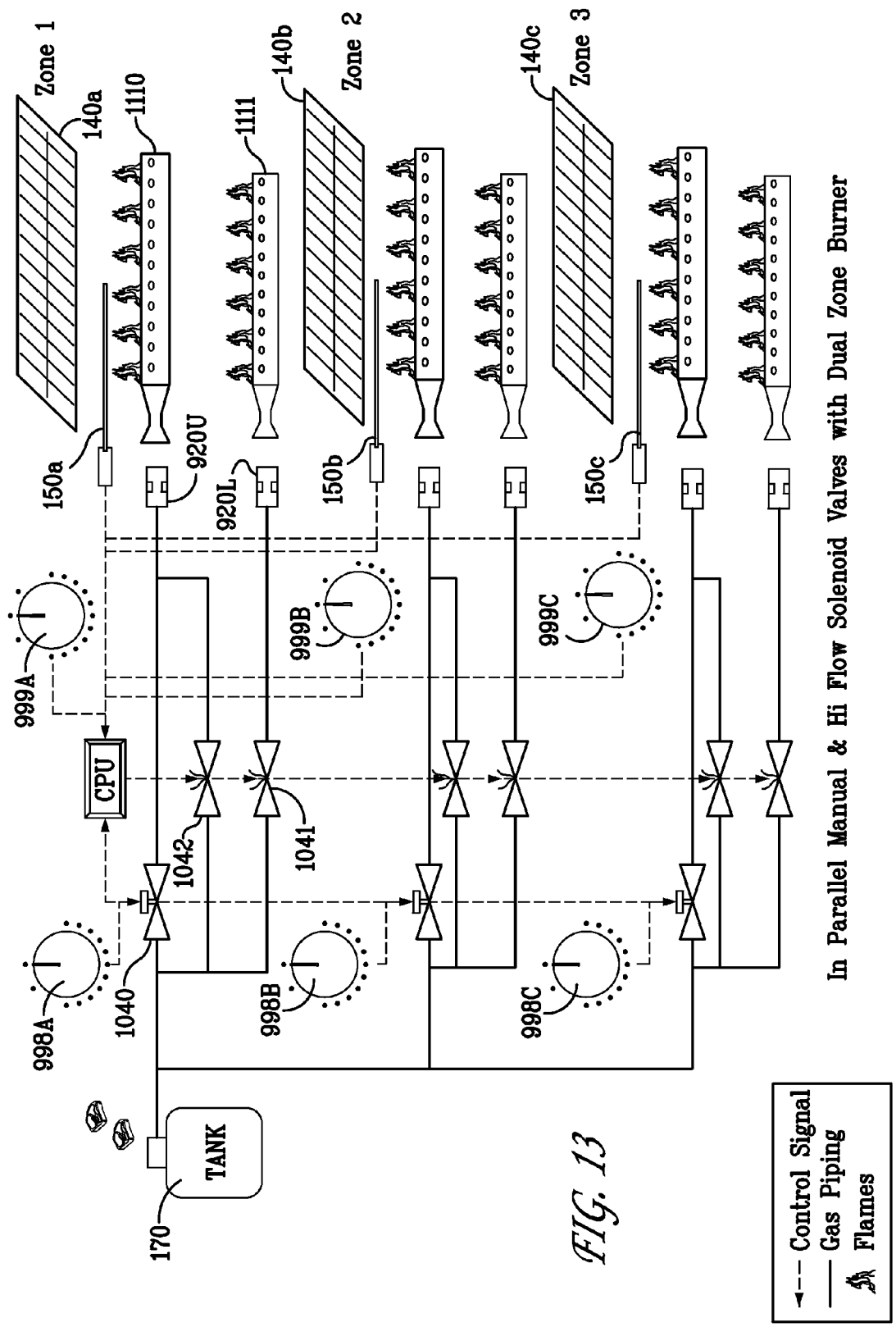

Referring to FIG. 13, an exemplary schematic diagram of a portion of control system for the grill 100 is shown in accordance with an exemplary embodiment. The control system of FIG. 13 is substantially similar to that described above with respect to FIG. 12. However, in this exemplary embodiment, the flow through the manual valve 1040 and hi-flow valve 1042 are directed to a hi-flow burner 1110 through orifice 920U while the fuel from the low-flow valve 1041 is directed into a separate low-flow burner 1111 through orifice 920L. In this example, the low-flow valve 1041 would be energized in most modes to allow fuel to flow to low-flow burner 1111 to ensure a minimum flame level for a respective grilling zone.

Figure 14:
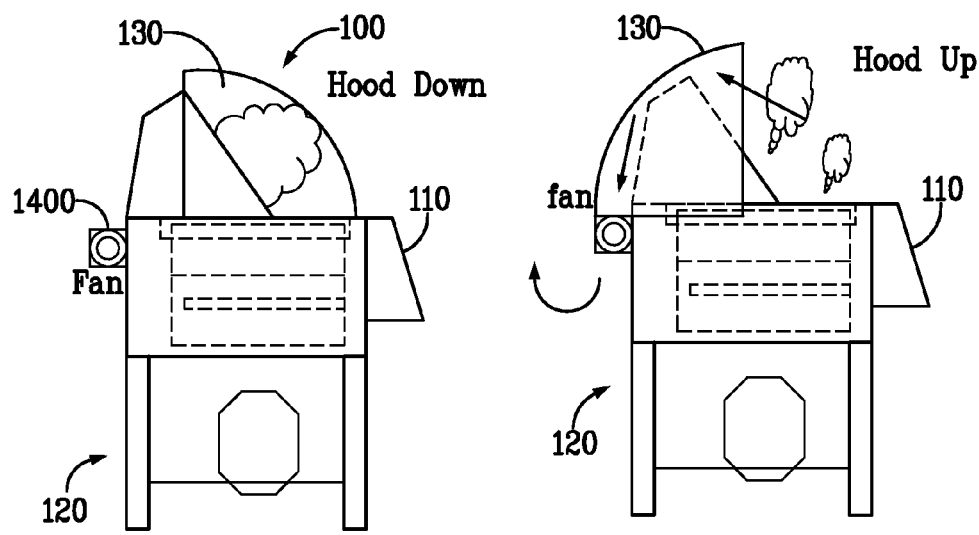
FIG. 14 illustrates a schematic side view of a grill in two configurations in accordance with an exemplary embodiment.

Referring to FIG. 14, in one exemplary embodiment, the grill 100 may include a smoke control system for controlling smoke and heat when the grill hood 130 is opened. In this exemplary embodiment, a suitable fan unit 1400, such as for example, a squirrel cage fan may be mounted to, for example, a back of the base 120. The hood 130 may be configured so that when the hood 130 is in the open position a channel is formed between the base 120 and the inside of the hood 130 such that the channel runs above the grilling area. The fan unit 1400 is configured to pull air from above the grilling area through the channel, so that any smoke and excess heat is drawn to the back of the grill 100. This flow of smoke and heat towards the back of the grill 100 through the channel substantially prevents the smoke and heat from bellowing towards, for example, the user's face and body when the hood 130 is opened. The grill 100 may include suitable sensors for detecting when the hood 130 is in the open position so that the fan unit 1400 can be energized to remove the smoke and excess heat from above the grilling area. The function of the fan unit 1400 is known in the art, and therefore will not be discussed further here. It should be understood that the smoke and heat control system shown in FIG. 14 is merely exemplary and that any suitable smoke and heat control system can be employed without departing from the scope of the exemplary embodiments.

Figure 15:
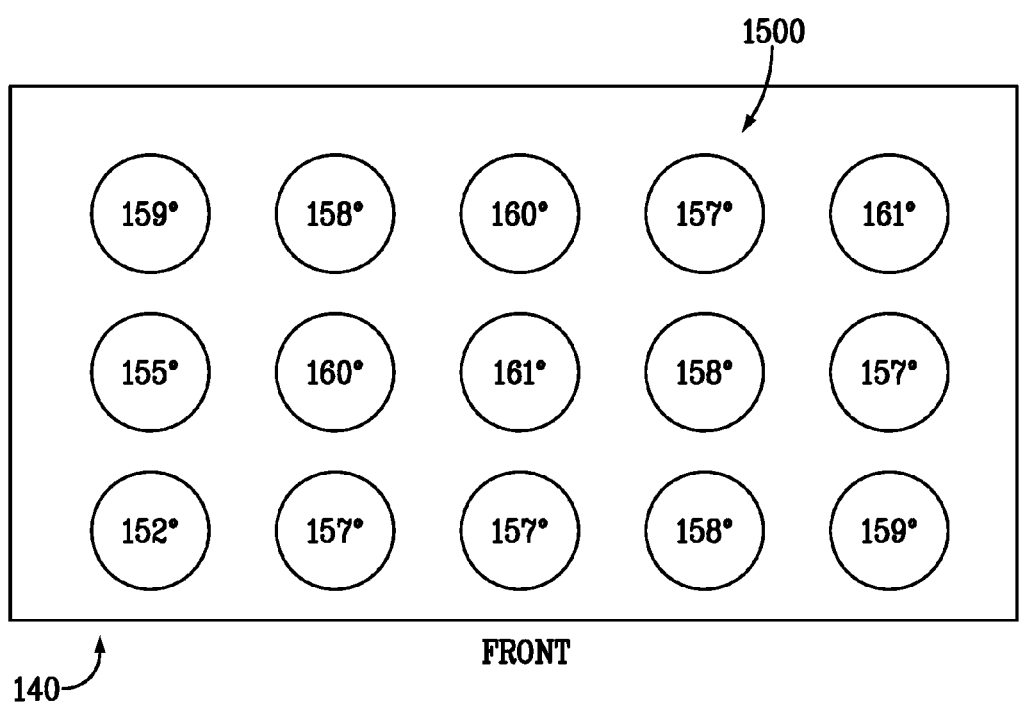
FIG. 15 illustrates one exemplary food temperature distribution of a grill in accordance with an exemplary embodiment.
Figure 16:
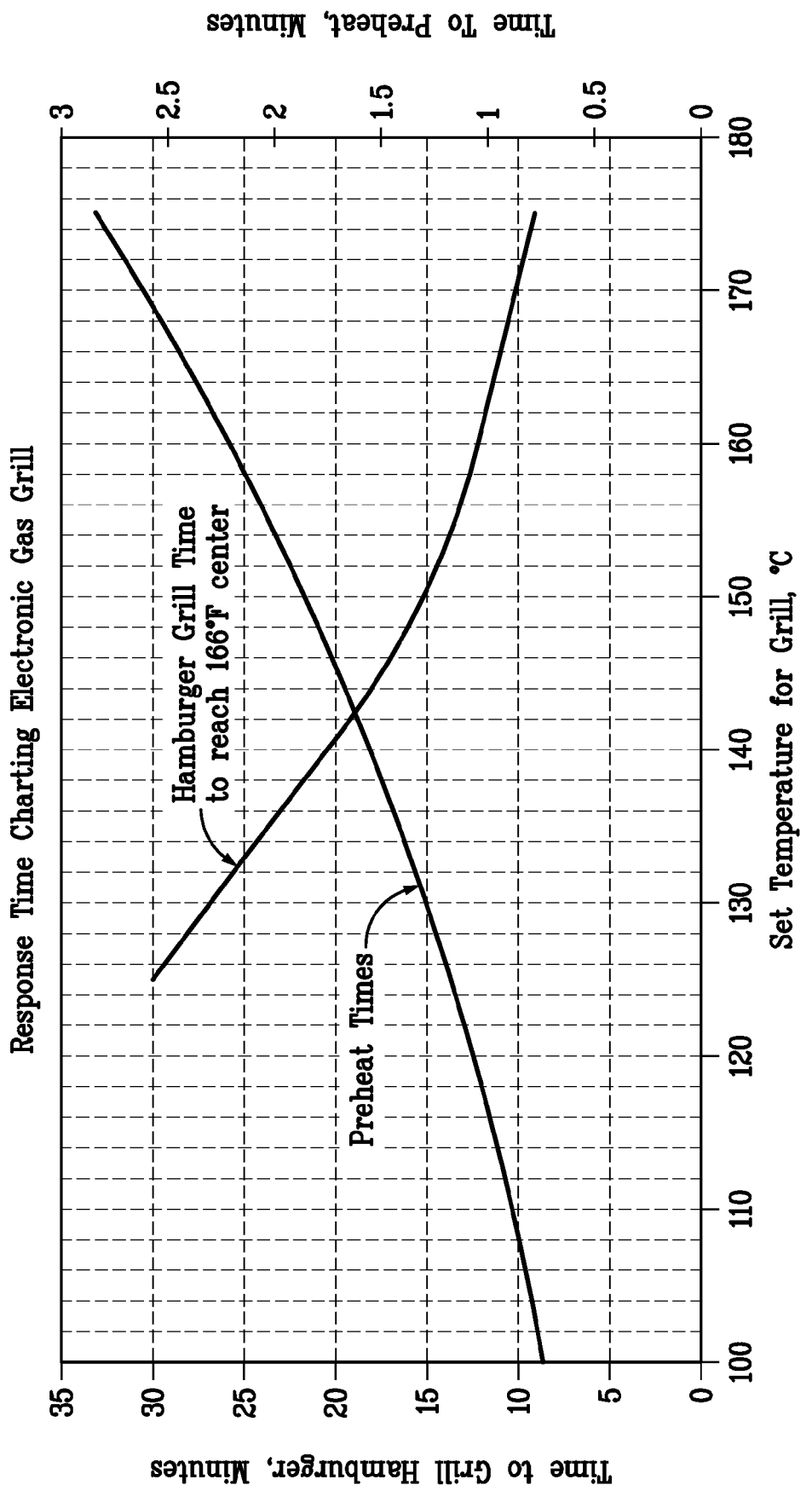
FIG. 16 is an exemplary graph illustrating a relationship between preheat time, cooking time and grill temperature.

The exemplary embodiments described above, provide a grill 100 having separate grilling zone controls that allow a large variation in temperatures between the grilling zones or a substantially uniform (e.g. even) temperature distribution over all of the grilling zones. As an example of the even temperature distribution that can be achieved with the exemplary embodiments, referring to FIG. 15, the center temperatures (in degrees farenheight) of, for example, fifteen one-quarter inch thick hamburger patties are shown. These center temperatures were obtained with all three grilling zones 140a-140c set to about 425° F. As can be seen in FIG. 15, the variation in temperature between the fifteen hamburger patties is about 9° F. Referring to FIG. 16, an exemplary graph illustrating an exemplary relationship between the hamburger grilling time, grill preheat time and grill temperature set point is shown.

Figure 17:
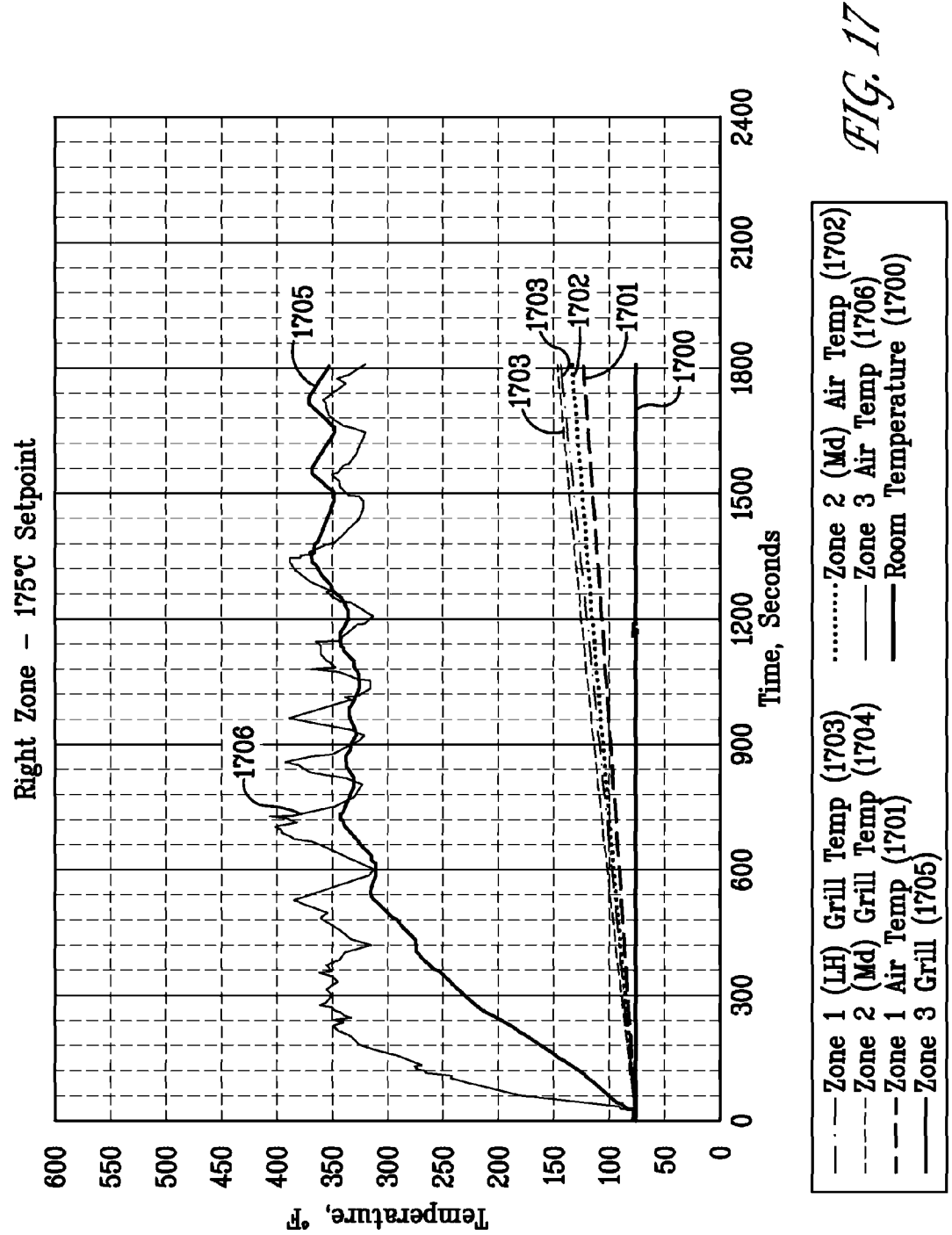
FIGS. 17-19 illustrate exemplary time-to-preheat graphs for different grilling zones of the grill shown in FIGS. 1A and 1B.
Figure 18:
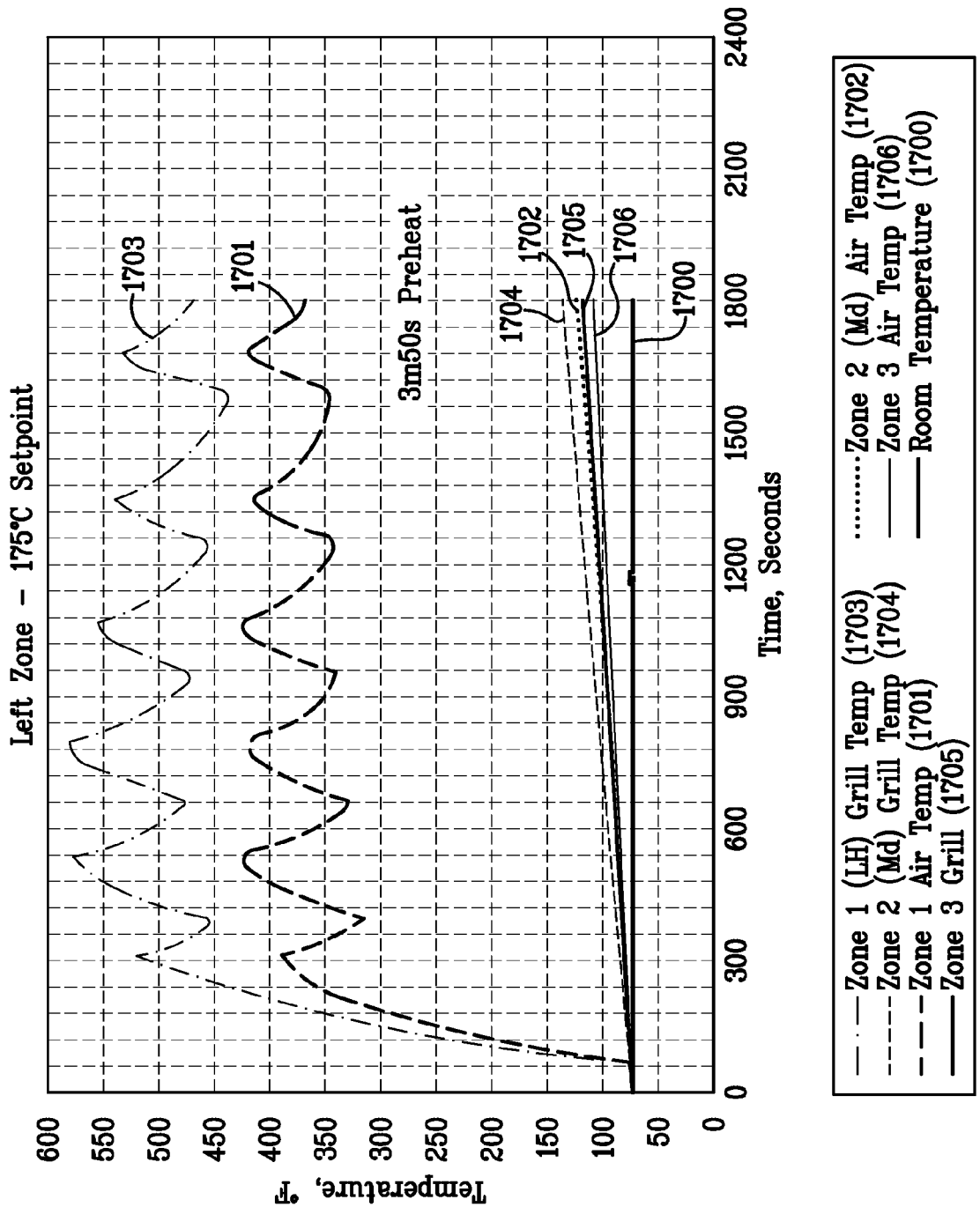
Figure 19:
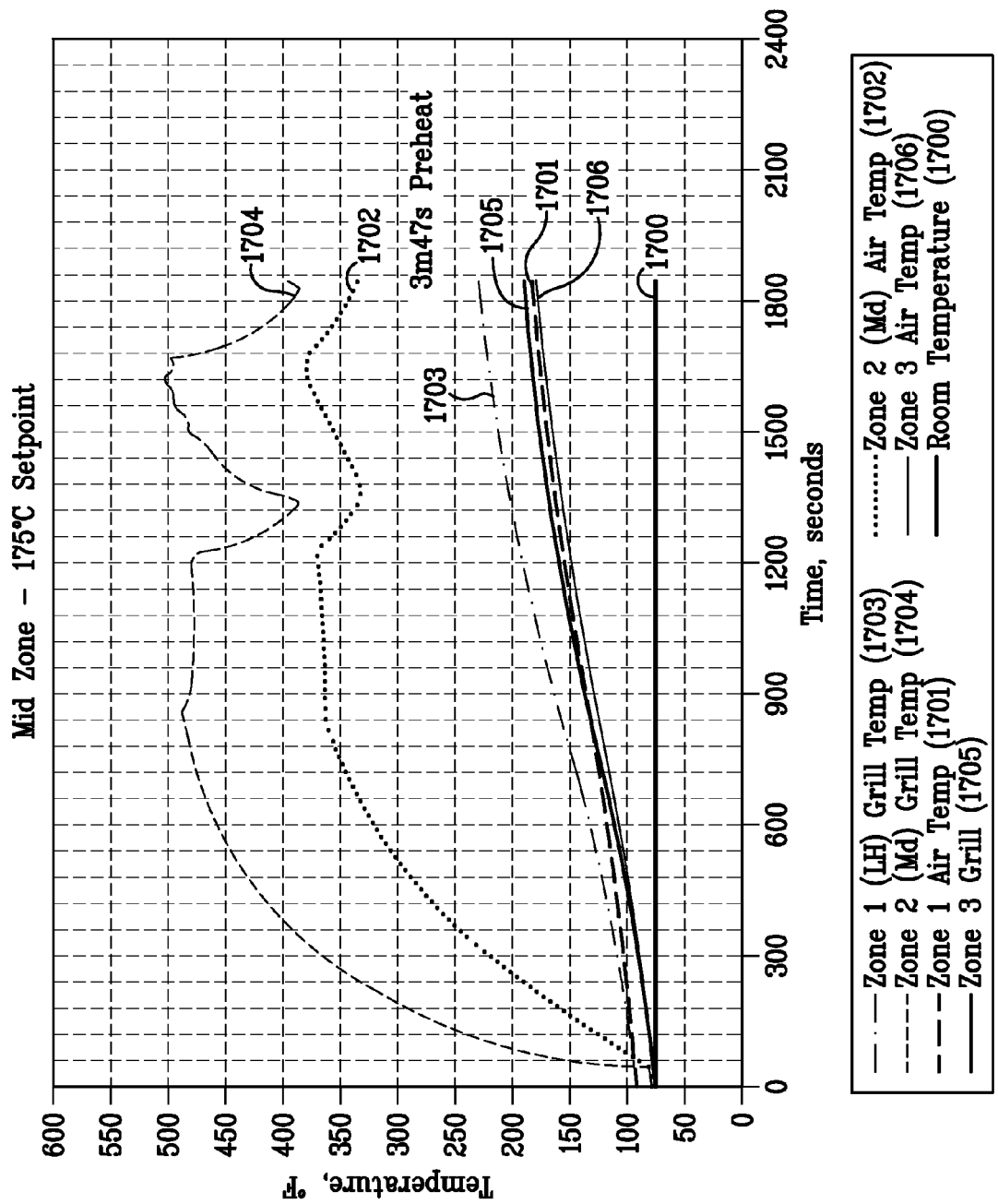

As one example of the large variation in temperatures that can be obtained with the exemplary embodiments between the grilling zones, FIGS. 17-19 illustrate exemplary graphs showing exemplary relationships between grilling zone temperature and time with respect to the preheating of the a respective grilling zone. It is noted that each graph illustrates the preheating of only one grilling zone to a temperature of about 175° C. (347° F.) while the other grilling zones remain off or at their lowest burning temperature (e.g. only one grilling zone is active at a time). As can be seen in the figures, the preheat time for all three grilling zones 140a-140c is about 4 minutes when only one grilling zone is active. In the figures line 1700 represents room temperature, line 1701 represents the left zone 140a (zone 1) air temperature, line 1702 represents the middle zone 140b (zone 2) air temperature, line 1703 represents the left zone 140a grilling temperature, line 1704 represents the middle zone 140b grilling temperature, line 1705 represents the right zone 140c (zone 3) grilling temperature, and line 1706 represents the right zone 140c (zone 3) air temperature.

Figure 20:
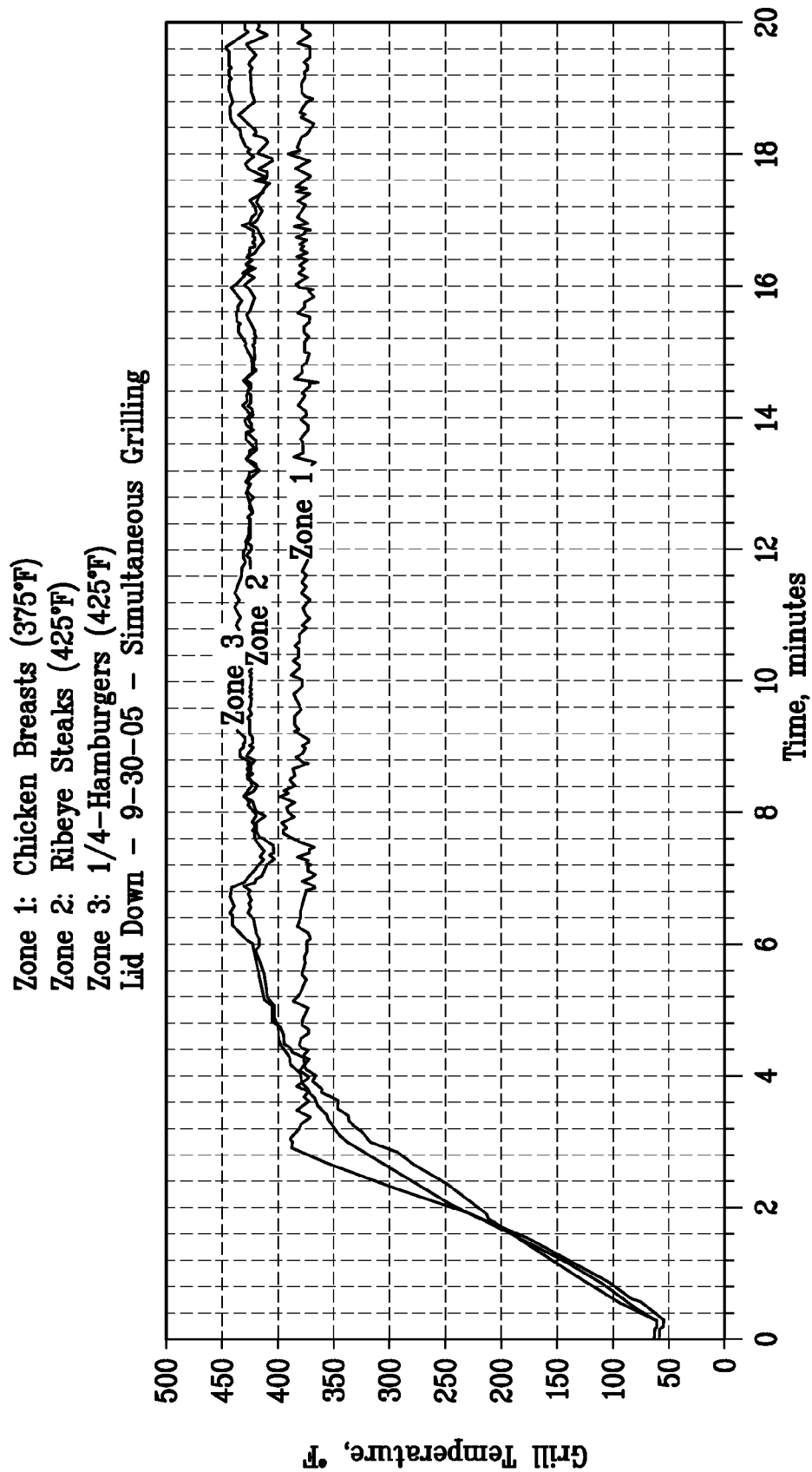
FIG. 20 is a graph illustrating exemplary grill temperatures for different grilling zones in accordance with an exemplary embodiment.

As another example of the large variation in temperatures that can be obtained with the exemplary embodiments between the grilling zones, one grilling zone may be set at about 250° F. while another grilling zone may be set at about 500° F. For example, as can be seen in FIG. 20, a graph illustrating the grill temperatures versus time for the three grilling zones 140a-140c (zones 1-3 respectively) where zone 140a is set to 375° F., and zones 140b, 140c are set to 425° F.

Figure 21:
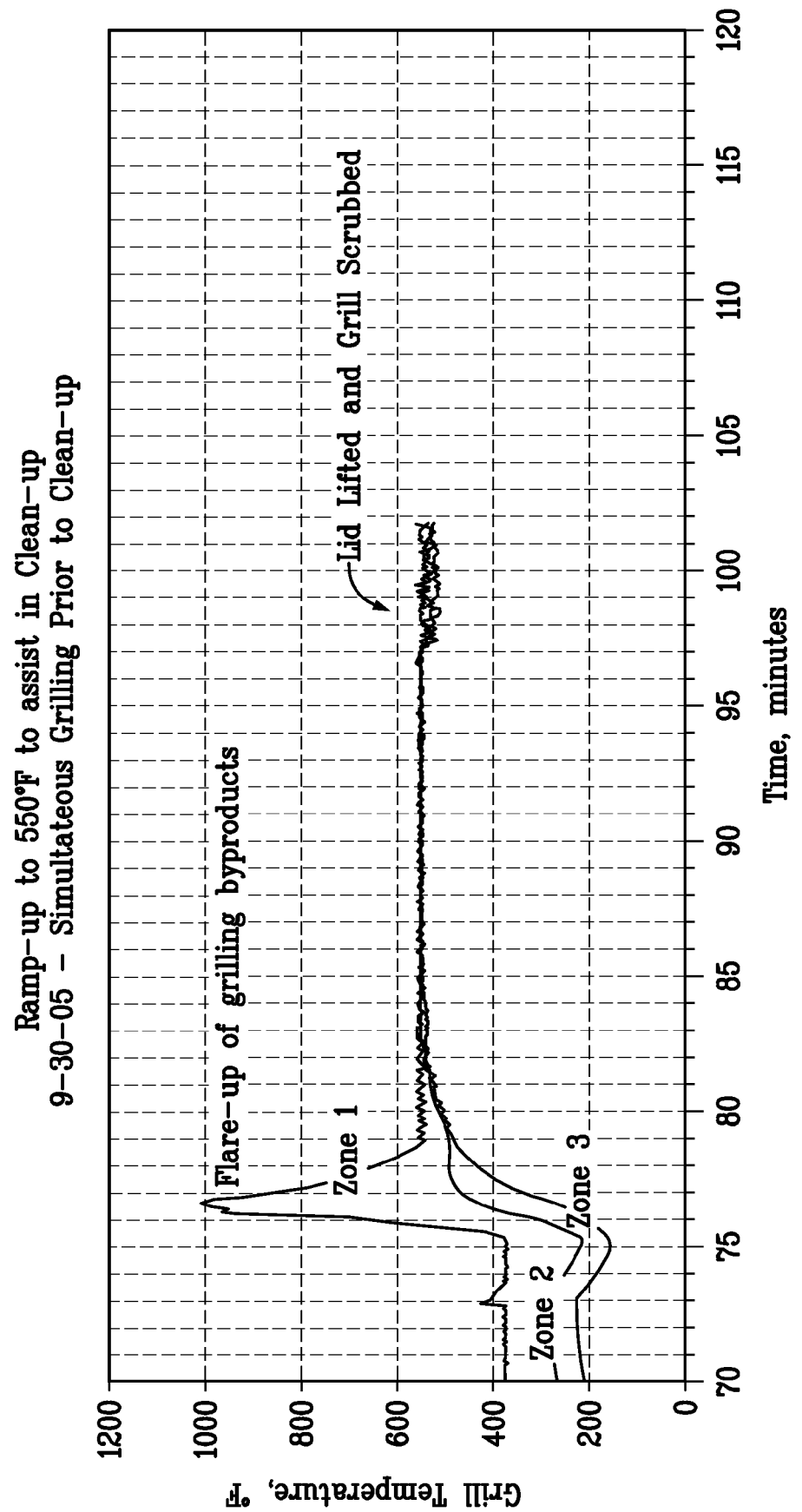
FIG. 21 is a graph illustrating exemplary grill cleaning temperatures for different grilling zones in accordance with an exemplary embodiment.
Figure 22:
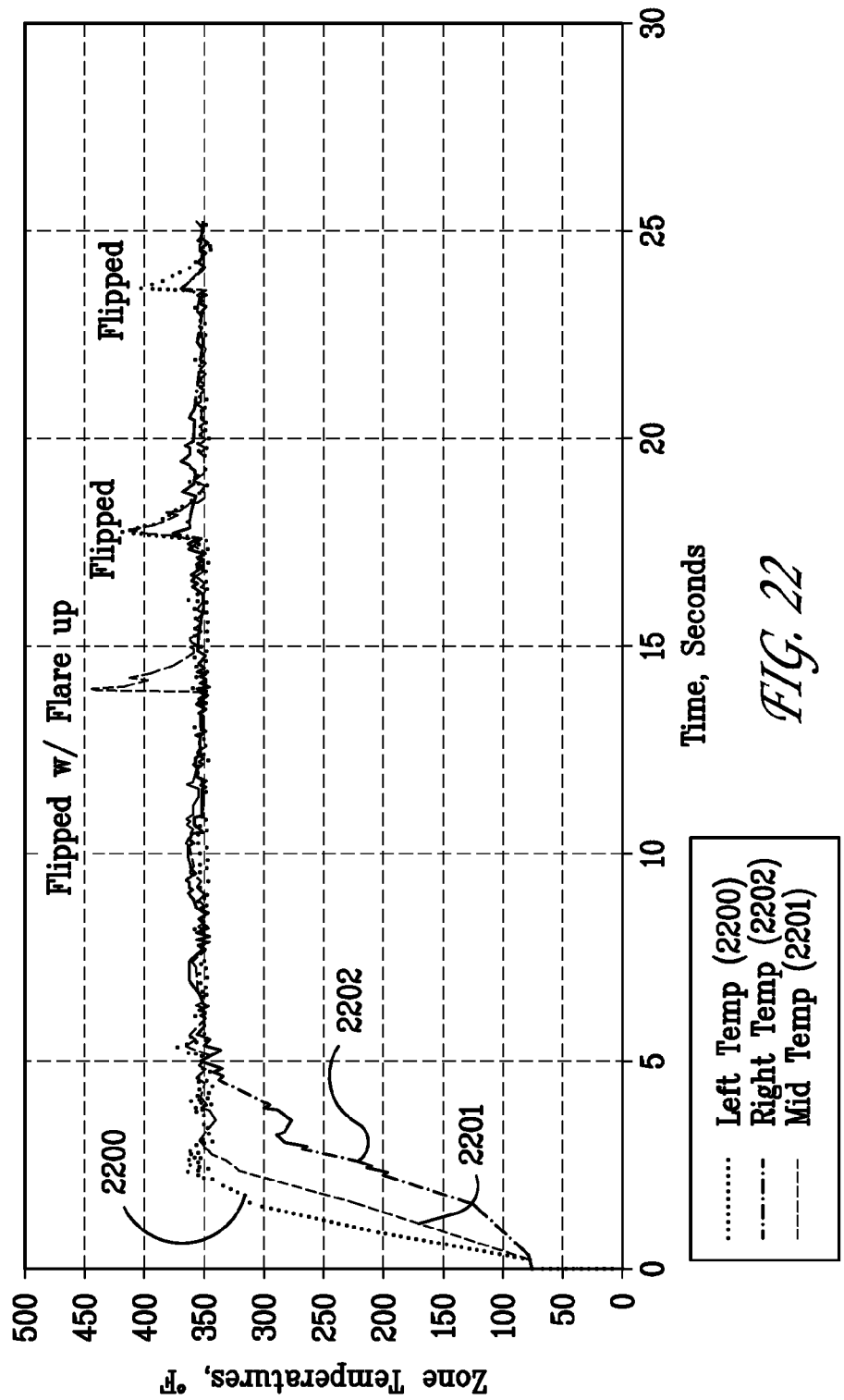
FIG. 22 is a graph illustrating exemplary grilling zone temperatures in accordance with an exemplary embodiment.
Figure 23:
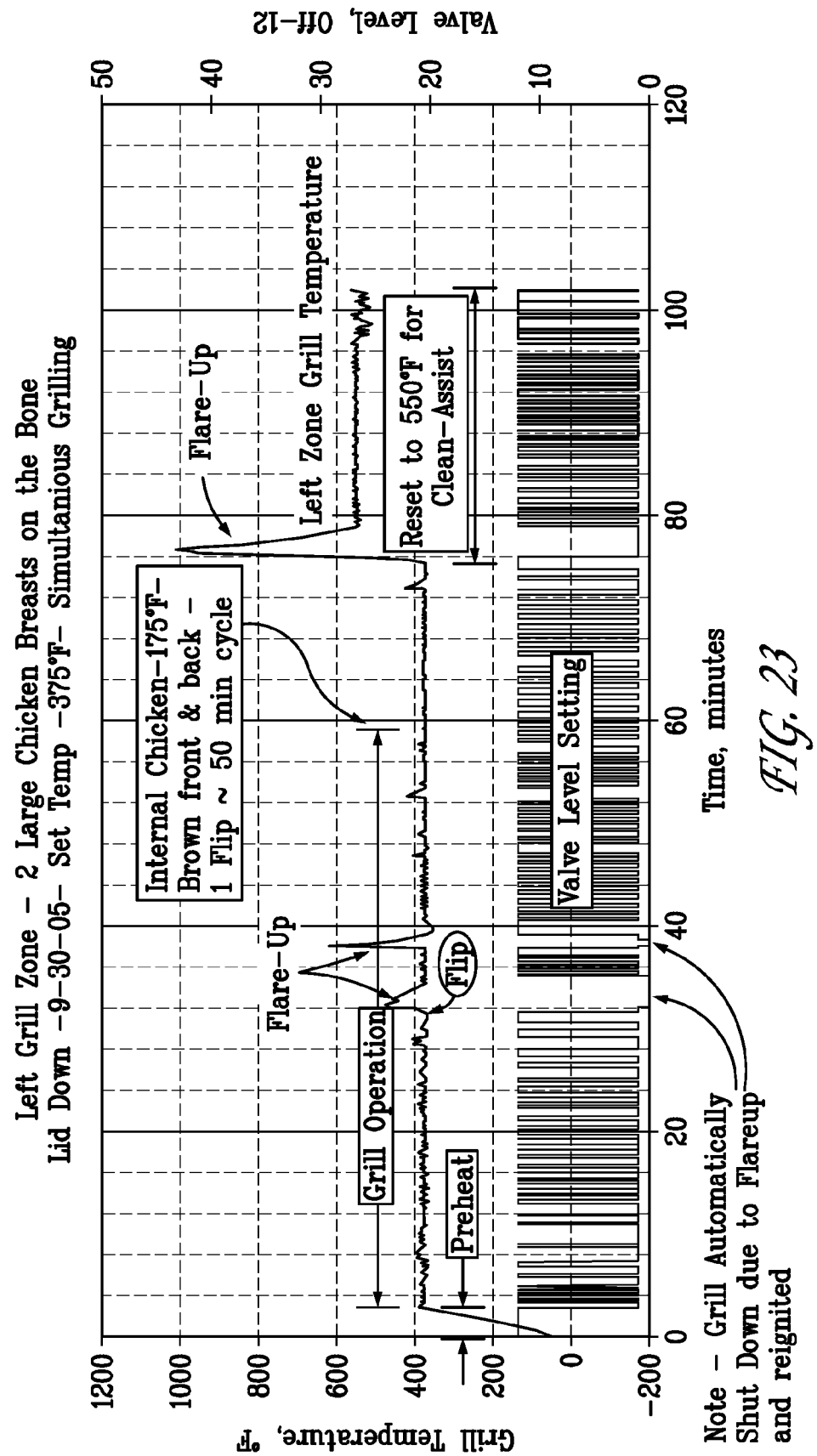
FIGS. 23-25 are graphs illustrating exemplary valve settings for different grilling zones of the grill in FIGS. 1A and 1B.
Figure 24:
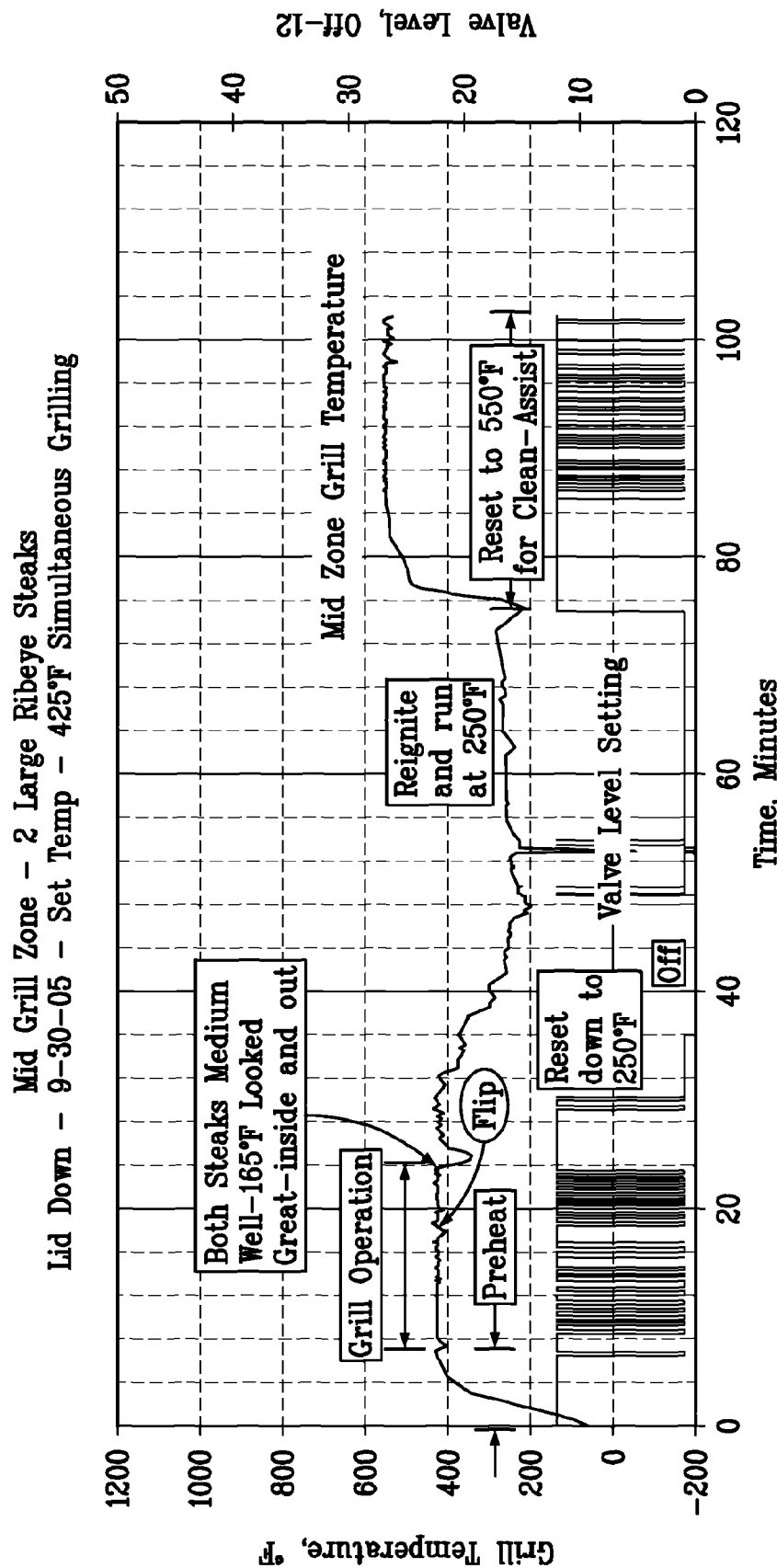
Figure 25:
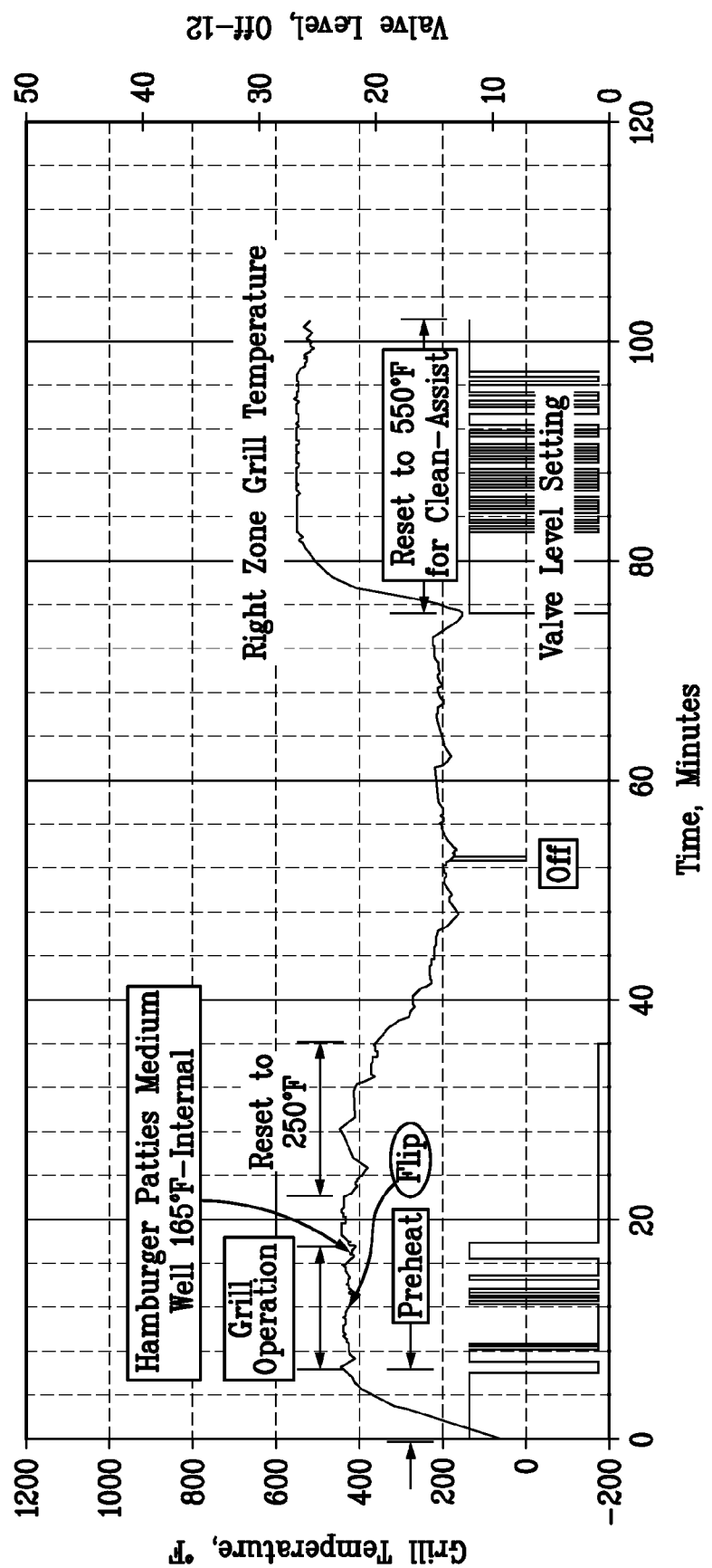

Referring to FIGS. 21-25, the exemplary graphs illustrate the control of the burners in accordance with the exemplary embodiments. FIG. 21 illustrates grilling zone temperatures for a cleaning mode of the grill 100 where the temperature in each zone is ramped up to about 550° F. In one exemplary embodiment, after the food is cooked the control unit 330 may automatically ramp the grill temperature to a cleaning temperature to assist in cleaning the grill 100. FIG. 22 illustrates the evenness of the grilling zone temperatures (within about ±10 degrees) when grilling, for example, six hamburgers, where line 2200 represents zone 140a, line 2201 represents zone 140b and line 2202 represents zone 140c. FIGS. 23-25 illustrates the fuel flow valve control of the left grilling zone 140a (FIG. 23), the middle grilling zone 140b (FIG. 24) and the right grilling zone 140c (FIG. 25) with respect to grill temperature variations due to preheating, cooking, flipping the food, flare-ups and cleaning. As can be seen in FIG. 23, the flame is shut down or the valve is closed when the grill temperature within the zone exceeds about 50° F. above the grill temperature set point, which in this example is about 375° F. for zone 140a and about 425° F. for zones 140b, 140c. The flame is shut down in the event of a flare-up and re-ignites after the grill temperature drops below the set point.

The exemplary embodiments described herein provide for a grill 100 having automatic or manual control capabilities for separately controlling multiple grilling zones. The grill includes alerts for conveying grilling information to the user as well as remote control/alert capabilities. Various probes, such as the food temperature probes and grill temperature probes described above, provide for evenness of grilling temperatures, substantially no burning of food, preset optimized food cooking settings and flare up sensing.

Thus, while there have been shown and described and pointed out fundamental novel features of the invention as applied to the exemplary embodiments thereof, it will be understood that various omissions and substitutions and changes in the form and details of devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system for a gas grill having a cooking surface, comprising:
   at least two fuel flow valves located between a fuel source and at least one grill burner of the gas grill, wherein the at least two fuel flow valves comprise at least two electronically operated fuel flow valves configured in a parallel relationship relative to the fuel source, one of the at least two electronically operated fuel flow valves comprising a high flow valve, and an other of the at least two electronically operated fuel flow valves comprising a low flow valve;
   a manually operated fuel flow valve for controlling an amount of fuel transferred to the at least two electronically operated fuel flow valves from the fuel source, wherein the manually operated fuel flow valve is coupled in parallel with at least one of the at least two electronically operated fuel flow valves;
   a user interface unit configured to receive a grill operation setting;
   at least one temperature sensor disposed adjacent to the cooking surface and configured to detect at least a grill operating temperature; and
   a control unit configured to:
      receive the grill operation setting from the user interface unit,
      receive the grill operating temperature from the at least one temperature sensor, and
      automatically control the at least two electronically operated fuel flow valves for modulating the amount of fuel delivered to the at least one grill burner to maintain the grill operating temperature at a predetermined temperature based on the grill operation setting and the grill operating temperature by diverting a fuel flow downstream of the manually operated fuel flow valve through the high flow valve and diverting a fuel flow upstream of the manually operated fuel flow valve through the low flow valve.

2. The control system of claim 1, wherein the gas grill includes a plurality of grilling zones, the control unit being further configured to independently maintain the grill operating temperature at a respective predetermined temperature for each of the grilling zones.

3. The control system of claim 1, further comprising at least one food temperature probe configured to detect a food temperature of food being cooked on the gas grill, wherein the control unit is configured to receive the food temperature and present an indication of the food temperature through the user interface unit.

4. The control system of claim 1, wherein the control unit is further configured to:

cause the at least one grill burner to operate at a maximum combustion rate when the grill operating temperature is below the predetermined temperature;

cause the at least one grill burner to operate at a minimum combustion rate when the grill operating temperature is above the predetermined temperature; and stop a flow of fuel to the at least one grill burner when a flare-up condition is detected by the at least one temperature sensor.

5. The control system of claim 1, further comprising a transmitter connected to the control unit, and a portable receiver with a second user interface unit, the transmitter being configured to transmit grill operating information to the portable receiver for presentment on the second user interface unit.

6. The control system of claim 1, wherein the at least one grill burner comprises a hi-flow burner and a low-flow burner.

7. The control system of claim 1, wherein the user interface unit comprises one or more of analog and electronic control devices.

8. A method for controlling a gas grill having a plurality of grilling zones each having at least one burner and at least two electronically operated fuel flow valves configured in a parallel relationship, the method comprising:

sensing a grill operating temperature of a respective grilling zone;

determining a temperature difference between the grill operating temperature and a predetermined grill temperature set point; and automatically modulating the at least one burner of the respective grilling zone by controlling the fuel flow through the at least two electronically operated fuel flow valves in response to the temperature difference by diverting the fuel flow through a high flow valve located downstream from a manual valve and diverting the fuel flow upstream of the manual valve through a low flow valve.

9. The method of claim 8, wherein the modulating step comprises:

operating the at least one burner at a maximum combustion rate when the grill operating temperature is below the predetermined grill temperature set point;

operating the at least one burner at a minimum combustion rate when the grill operating temperature is above the predetermined grill temperature set point; and stopping a flow of fuel to the at least one burner when a flare-up condition is detected.

10. The method of claim 8, wherein the grill operating temperature of each grilling zone is independently controlled to maintain the each grilling zone at a respective predetermined grill temperature set point.

11. The method of claim 8, further comprising transmitting grill operating information of the gas grill to a portable receiver.

12. The method of claim 8, further comprising presenting a status of food being cooked in the respective grilling zone through a user interface unit of the gas grill.

13. A gas grill comprising:

a plurality of grilling zones each having at least one burner and a cooking surface;

a temperature sensor located within a respective one of the grilling zones and adjacent to a respective cooking surface, the temperature sensor being configured to detect an operating temperature of the respective one of the grilling zones;

a user interface unit for receiving a grill operating setting for the respective one of the grilling zones;

a control unit configured to automatically control a temperature of the respective one of the grilling zones based on a respective operating temperature of the respective one of the grilling zones and the respective grill operating setting for the respective one of the grilling zones; and at least two electronically operated fuel flow valves connected to the control unit for controlling an amount of fuel transferred to the at least one burner of the respective one of the grilling zones, wherein the at least two electronically operated fuel flow valves are configured in a parallel relationship, one of the at least two electronically operated fuel flow valves comprising a high flow valve, and an other of the at least two electronically operated fuel flow valves comprising a low flow valve; and a manually operated fuel flow valve connected to the control unit for controlling an amount of fuel transferred to the at least two electronically operated fuel flow valves, wherein the manually operated valve is coupled in parallel with at least one of the at least two electronically operated fuel flow valves, wherein the control unit is configured to automatically control the at least two electronically operated fuel flow valves for modulating the amount of fuel transferred to the at least one burner to maintain the respective operating temperature at a predetermined temperature based on the respective grill operating setting and the respective operating temperature by diverting a fuel flow downstream of the manually operated fuel flow valve through the high flow valve and diverting a fuel flow upstream of the manually operated fuel flow valve through the low flow valve.

14. The gas grill of claim 13, wherein the manually operated fuel flow valve is coupled in series with at least one electronically controlled valve.

15. The gas grill of claim 13, wherein the at least one burner of the respective one of the grilling zones comprises a hi-flow burner and a low-flow burner.

16. The gas grill of claim 13, further comprising at least one food temperature probe configured to detect a food temperature of food being cooked on the gas grill, wherein the control unit is configured to receive the food temperature and present an indication of the food temperature through the user interface unit.

17. The gas grill of claim 13, wherein the control unit is further configured to:

cause the at least one burner of a respective grilling zone to operate at a maximum combustion rate when the respective operating temperature of the respective grilling zone is below a predetermined temperature set point;

cause the at least one burner of the respective grilling zone to operate at a minimum combustion rate when the respective operating temperature of the respective grilling zone is above the predetermined temperature set point; and stop a flow of fuel to the at least one burner of the respective grilling zone when a flare-up condition is detected in the respective grilling zone by the respective temperature sensor.

18. The gas grill of claim 13, further comprising a portable receiver and a transmitter connected to the control unit and the portable receiver, the portable receiver having a second user interface unit, the transmitter being configured to transmit grill operating information to the portable receiver for presentment on the second user interface unit.

* * * * *